US011981142B2

(12) United States Patent
Tamaru et al.

(10) Patent No.: US 11,981,142 B2
(45) Date of Patent: May 14, 2024

(54) LIQUID STORING CONTAINER AND LIQUID EJECTION DEVICE

(71) Applicant: CANON KABUSHIKI KAISHA, Tokyo (JP)

(72) Inventors: Yuji Tamaru, Tokyo (JP); Kyosuke Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 17/841,254

(22) Filed: Jun. 15, 2022

(65) Prior Publication Data

US 2022/0402272 A1 Dec. 22, 2022

(30) Foreign Application Priority Data

Jun. 21, 2021 (JP) ................................ 2021-102453

(51) Int. Cl.
*B41J 2/175* (2006.01)

(52) U.S. Cl.
CPC .................................... *B41J 2/175* (2013.01)

(58) Field of Classification Search
CPC .. B41J 2/14145; B41J 2/14024; B41J 2/1404; B41J 2/175; B41J 2/14072; B41J 2/18; B41J 2202/19; B41J 2202/21; B41J 2202/12; B41J 2202/20
See application file for complete search history.

(56) References Cited

U.S. PATENT DOCUMENTS 7,789,488 B2 * 9/2010 Mori .................... H05K 1/0271 347/50
10,179,453 B2 1/2019 Okushima et al.
10,493,750 B2 * 12/2019 Nakamura ............... B41J 2/175
10,518,548 B2 * 12/2019 Yamada ................. B41J 2/0458
10,821,736 B2 * 11/2020 Okushima .................. B41J 2/19

FOREIGN PATENT DOCUMENTS

JP 2017-124619 A 7/2017

* cited by examiner

*Primary Examiner* — An H Do
(74) *Attorney, Agent, or Firm* — Venable LLP

(57) ABSTRACT

A liquid ejection head includes a recording element substrate having a substrate provided with a plurality of flow paths for liquid to be ejected on a recording material by a recording element and a cover member that is provided with a plurality of communication holes in communication with the plurality of flow paths and that is joined to the substrate, a liquid supply member supplying the liquid to the plurality of flow paths through the plurality of communication holes of the cover member, and an adhesive member adhering the cover member and the liquid supply member. At least a part of an abutment region of the cover member in abutment against the substrate and apart from a region provided with the plurality of communication holes has a cover member opening for contacting the adhesive member and the substrate to each other.

16 Claims, 18 Drawing Sheets

LIQUID STORING CONTAINER AND LIQUID EJECTION DEVICE

BACKGROUND OF THE INVENTION

Field of the Invention

The present invention relates to a liquid ejection head and a liquid ejection device.

Description of the Related Art

There has been a demand for high-definition and high-quality recording as the range of recording applications has become more diverse in recent years in the field of inkjet recording, where a liquid such as ink is ejected onto a recording medium for recording. In order to achieve such high-definition and high-quality recording, thickening of ink which may be caused by moisture loss from ejection outlets has to be reduced because the thickening could give rise to decrease in the liquid ejection speed or changes in the thickness of the color material.

A known method for reducing thickening of ink which may be caused by moisture loss from an ejection outlet is to force ink in the pressure chamber provided with the ejection outlet to flow, so that thickened ink remaining in the pressure chamber is made to flow out. A liquid ejection head according to Japanese Patent Application Publication No. 2017-124619 is provided with a supply path which supplies liquid and a recovery path which recovers the liquid as flow paths communicating with a pressure chamber, and the supply path and the recovery path are each provided with a plurality of communication holes in communication with these paths. In this way, the liquid ejection head according to Japanese Patent Application Publication No. 2017-124619 allows the liquid in the pressure chamber to be let in/out while controlling variations in the liquid flow rate.

In the liquid ejection head according to Japanese Patent Application Publication No. 2017-124619, an ink supply path and a recovery path provided at a head case, and a supply path and a recovery path provided at a substrate which forms a recording element substrate can be connected by pitch conversion with a cover member provided at the back surface of the substrate. The cover member has communication holes corresponding to the supply path and the recovery path at the substrate each with a narrow pitch. Therefore, it is desirable that a photosensitive resin material is used for the cover member, and the communication holes are formed by photolithography. The cover member is preferably formed with a thin film in order to reduce the flow resistance at the communication holes.

However, the conventional liquid ejection head described above has the cover member made of a thin film, and therefore the adhesion between the substrate of the recording element substrate and the cover member of the liquid ejection head can be lowered. When the substrate and the cover member are joined with each other using an adhesive member and the layer of the adhesion member has a large thickness, the recording element substrate may have an increased thickness or the precision in placement of the recording element substrate can be lowered because of unevenness in the thickness of the adhesive member. Meanwhile, as the thickness of the layer of the adhesive member between the substrate and the cover member is reduced, sufficient adhesion may not be achieved.

When the substrate and the cover member are joined by an alternative connecting method, physical stress, for example, due to deflection can be a concern because the cover member is thin. As a result, the conventional recording element substrate can suffer from interface delamination between the substrate and the cover member. When there are multiple flow paths provided at the substrate, the multiple flow paths may communicate with one another.

SUMMARY OF THE INVENTION

With the foregoing in view, it is an object of the present invention to provide a liquid ejection head which is less likely to have interface delamination between the substrate and the cover member.

According to an aspect of the present disclosure, a liquid ejection head includes a recording element substrate having a substrate provided with a plurality of flow paths for liquid to be ejected on a recording material by a recording element and a cover member that is provided with a plurality of communication holes in communication with the plurality of flow paths and that is joined to the substrate, a liquid supply member supplying the liquid to the plurality of flow paths through the plurality of communication holes of the cover member, and an adhesive member adhering the cover member and the liquid supply member, wherein at least a part of an abutment region of the cover member in abutment against the substrate and apart from a region provided with the plurality of communication holes has a cover member opening for contacting the adhesive member and the substrate to each other.

In addition, according to an aspect of the present disclosure, a liquid ejection head includes a recording element substrate having a substrate provided with a plurality of flow paths for liquid to be ejected on a recording material by a recording device and a cover member that is provided with a plurality of communication holes in communication with the plurality of flow paths and that is joined to the substrate, a liquid supply member supplying the liquid to the plurality of flow paths through the plurality of communication holes of the cover member, and an adhesive member adhering the cover member and the liquid supply member, wherein the cover member comprises a plurality of partitioning members divided respectively for the plurality of flow paths, the plurality of partitioning members are provided a distance apart from one another, and a gap between the plurality of petitioning members serves as a cover member opening through which the adhesive member and the substrate are in contact.

In addition, according to an aspect of the present disclosure, a liquid ejection device includes a tank for storing liquid, and a liquid ejection head ejecting the liquid stored in the tank, the liquid ejection head including a recording element substrate having a substrate provided with a plurality of flow paths for liquid to be ejected on a recording material by a recording element and a cover member that is provided with a plurality of communication holes in communication with the plurality of flow paths and that is joined to the substrate, a liquid supply member supplying the liquid to the plurality of flow paths through the plurality of communication holes of the cover member, and an adhesive member adhering the cover member and the liquid supply member, wherein at least a part of an abutment region of the cover member in abutment against the substrate and apart from a region provided with the plurality of communication holes has a cover member opening for contacting the adhesive member and the substrate to each other.

Further features of the present invention will become apparent from the following description of exemplary embodiments with reference to the attached drawings.

DESCRIPTION OF THE EMBODIMENTS

Hereinafter, preferred environments of the disclosure will be described in conjunction with the drawings. Note however that the sizes, materials, shapes, and the relative arrangements of components should be changed as appropriate according to the configuration of a device to which the invention is applied or various conditions. Therefore, it is not intended to limit the scope of the invention by the following description. As for configurations and steps which are not specifically shown or described, well-known or known features in the technical field can be applied. The same description may not be repeated.

First Embodiment

Figure 1:
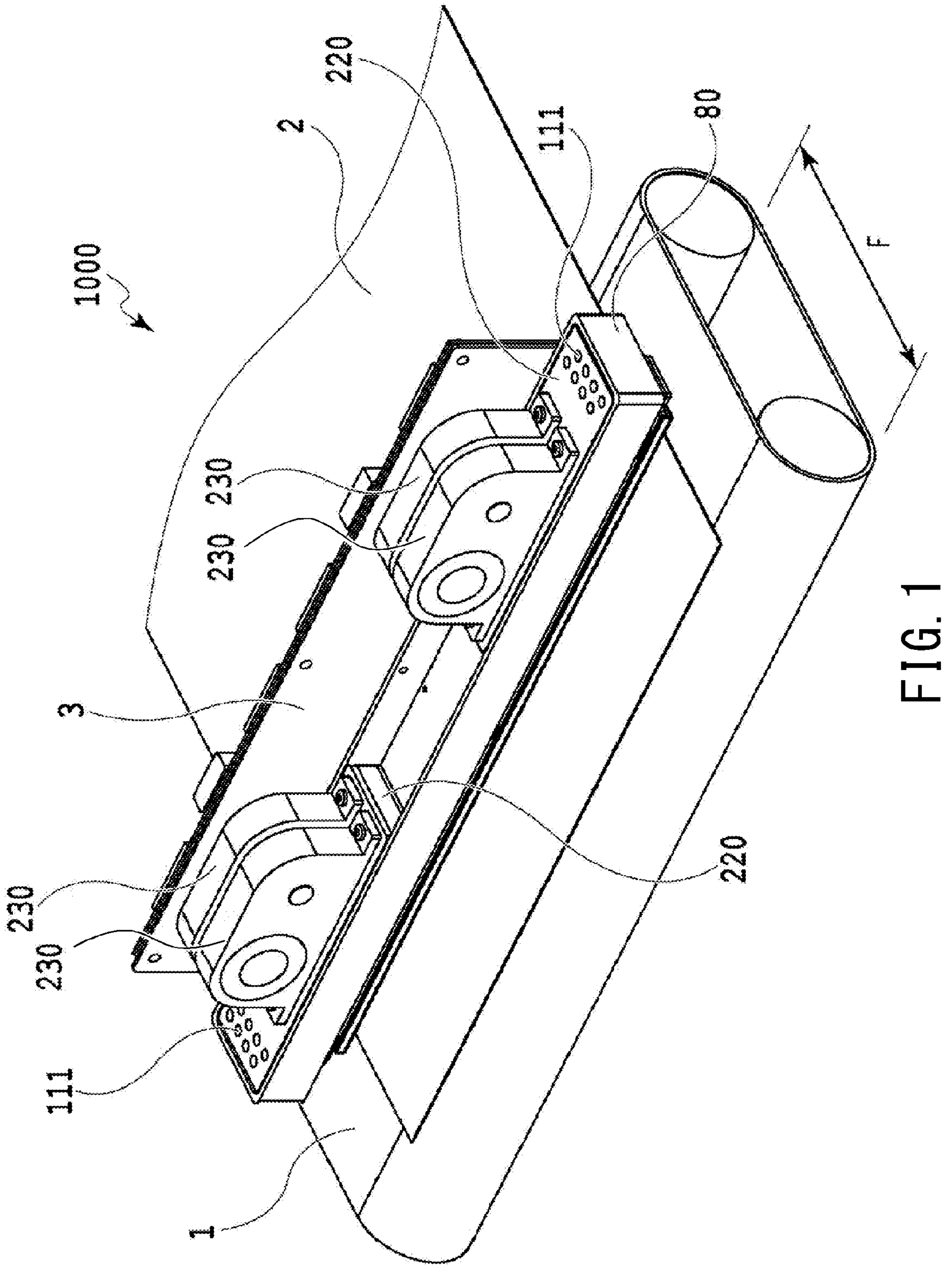
FIG. 1 is a schematic view of a liquid ejection device according to a first embodiment of the invention.

FIG. 1 is a schematic view of an inkjet recording device 1000 (hereinafter also referred to as a recording device) which carries out recording on a recording medium by ejecting liquid ink as an exemplary liquid ejection device according to a first embodiment of the invention. The recording device 1000 includes a transport unit 1 which transports a recording medium 2 and a line type (page wide type) liquid ejection head 3 provided substantially orthogonally to the direction in which the recording medium 2 is transported. The recording device 1000 is a line type recording device which carries out continuous recording in one path while continuously or intermittently transporting multiple recording mediums 2.

The liquid ejection head 3 includes a negative pressure control unit 230 which controls the pressure (negative pressure) in the flow path, a liquid supply unit 220 in fluid-communication with the negative pressure control unit 230, a liquid connection part 111 which functions as a supply opening and a discharge outlet for ink to/from the liquid supply unit 220, and a case 80. The recording medium 2 is not limited to cut paper but can also be a continuous roll medium. In this example, the liquid ejection head 3 enables full-color recording with cyan (C), magenta (M), yellow (Y), and black (K) inks. The ink supply path to the liquid ejection head 3, a main tank, and a buffer tank (see FIG. 2 below) are in fluid connection with one another. The liquid ejection head 3 is also electrically connected with an electrical control unit which transmits power for ejecting ink and a control signal to the liquid ejection head 3. The fluid path and the electrical signal path of the liquid ejection head 3 will be described below.

The recording device 1000 is an inkjet recording device in which ink circulates between a tank which will be described and the liquid ejection head 3. The ink circulation in the recording device 1000 is allowed by making two circulation pumps (for high pressure and low pressure) operate downstream of the liquid ejection head 3.

Figure 2:
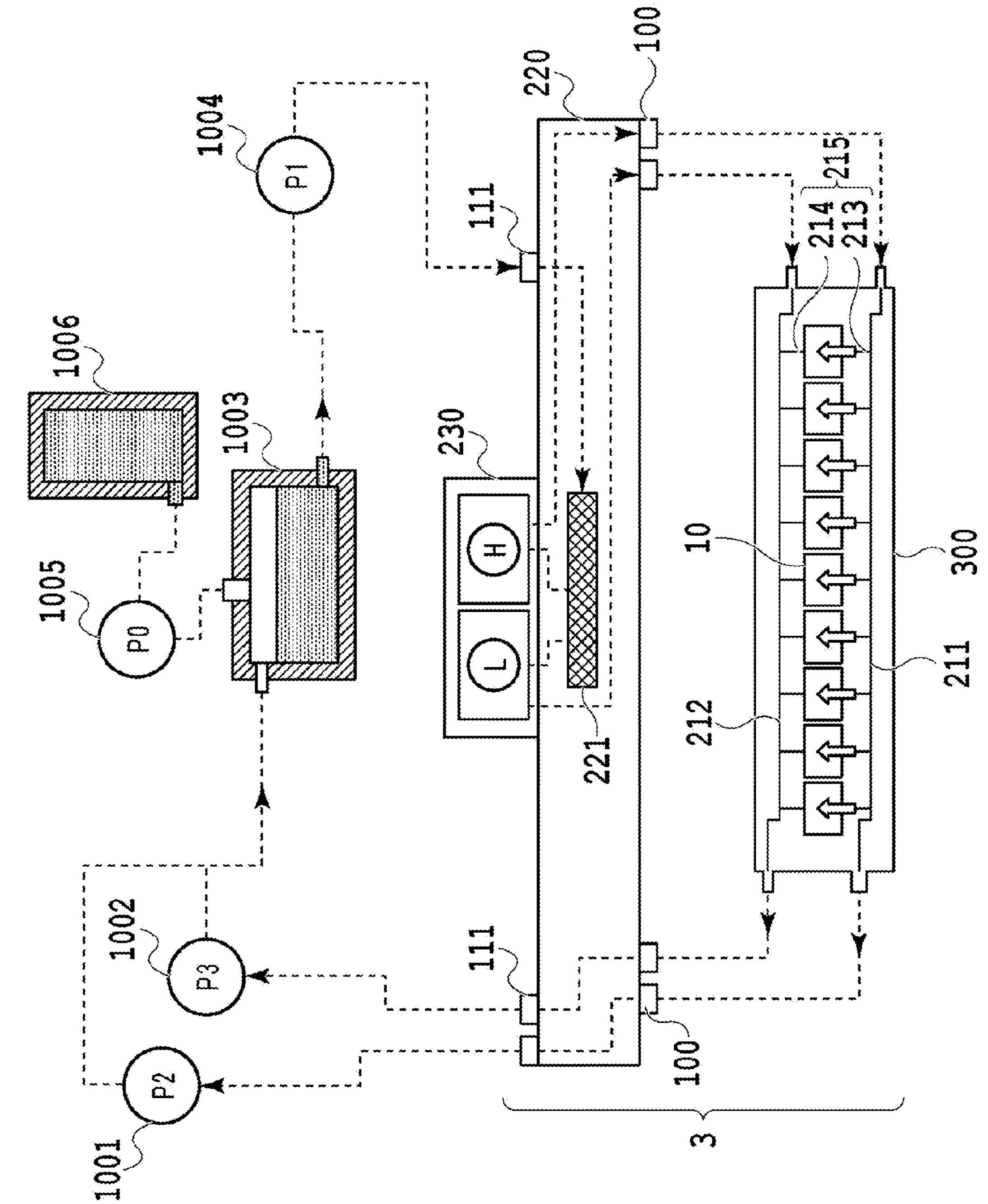
FIG. 2 is a schematic view of an ink circulation path according to the first embodiment.

FIG. 2 is a schematic view of an ink circulation path used in the recording device 1000 according to the embodiment. The liquid ejection head 3 is connected by fluid for example to a first circulation pump (on the high-pressure side) 1001, a first circulation pump (on the low-pressure side) 1002, and a buffer tank 1003. Note that FIG. 2 illustrates a circulation path for one of the cyan, magenta, yellow, and black inks for the sake of simplicity, but the circulation paths for the four colors are provided in the recording device 1000 in practice.

In the ink circulation path in the recording device 1000 according to the embodiment, the ink in the main tank 1006 is supplied to the buffer tank 1003 by a replenishing pump 1005. Thereafter, the ink is supplied to the liquid supply unit 220 of the liquid ejection head 3 by a second circulation pump 1004 through the liquid connection part 111. The ink adjusted to be at two different kinds of negative pressure (high pressure and low pressure) by the negative pressure control unit 230 connected to the liquid supply unit 220 is separated into the two flow paths on the high pressure and the low-pressure sides for circulation. The ink in the liquid ejection head 3 circulates in the liquid ejection head 3 by the function of the first circulation pump (on the high-pressure side) 1001 and the first circulation pump (on the low-pressure side) 1002 downstream of the liquid ejection head 3. The ink is discharged from the liquid ejection head 3 through the liquid connection part 111 and returns to the buffer tank 1003.

The buffer tank 1003 as a sub tank is connected to the main tank 1006, has an air communication hole (not shown) which communicates the inside and outside of the tank, and can externally discharge bubbles in the ink. The replenishing pump 1005 is provided between the buffer tank 1003 and the main tank 1006. The replenishing pump 1005 sends, to the buffer tank 1003 from the main tank 1006, ink consumed by ejecting (discharging) the ink from the ejection outlet of the liquid ejection head 3, for example, by recording or suction recovery by ejecting the ink.

The two first circulation pumps 1001 and 1002 suck the ink through the liquid connection part 111 of the liquid ejection head 3 and move the ink to the buffer tank 1003. The first circulation pump is preferably a displacement type pump with a quantitative solution sending capability. Specific examples of the displacement type pump may include a tube pump, a gear pump, a diaphragm pump, and a syringe pump, while, for example, a general constant flow valve or a relief valve may be provided at the pump outlet, so that the ink flow rate is kept constant. When the liquid ejection head 3 is driven, the first circulation pump (on the high-pressure side) 1001 and the first circulation pump (on the low-pressure side) 1002 are operated, so that a prescribed flow of ink is made to flow respectively in a common supply path 211 and a common recovery path 212. As the ink is made to flow in this manner, the liquid ejection head 3 is maintained at an appropriate temperature during recording. The flow rate of the ink while the liquid ejection head 3 is driven is preferably set to at least a level which can be maintained so that the temperature difference between the recording element substrates 10 does not affect the recording quality. However, As the ink flow rate increases, the pressure drop in the flow paths in a liquid ejection unit 300 may cause the negative pressure difference to increase among the recording element substrates 10, which may cause density variations in a resulting image. Therefore, the ink flow rate is preferably set in consideration of the temperature difference and the negative pressure difference among the recording element substrates 10.

The negative pressure control unit 230 is provided in the path between the second circulation pump 1004 and the liquid ejection unit 300. The negative pressure control unit 230 keeps the pressure downstream of the negative pressure control unit 230 (i.e., on the side of the liquid ejection unit 300) at a preset constant pressure when the ink flow rate in the circulation system fluctuates because of difference in the ejection amount per unit area. The two negative pressure control mechanisms that constitute the negative pressure control unit 230 may each be any kind of mechanism if the mechanism can control pressure fluctuations downstream of the negative pressure control unit 230 within a prescribed range around a desired set pressure. As an example, a mechanism identical to a so-called "pressure reducing regulator" can be used. In the circulation flow path according to the embodiment, the second circulation pump 1004 pressurizes the upstream side of the negative pressure control unit 230 through the liquid supply unit 220. In this way, the effect of the water head pressure of the buffer tank 1003 on the liquid ejection head 3 can be reduced, so that the layout of the buffer tank 1003 in the recording device 1000 may be more flexible.

The second circulation pump 1004 needs only have at least a prescribed lift pressure in the fluctuating range of the ink circulation flow rate used in driving the liquid ejection head 3 and a turbo type pump or a displacement type pump may be used. Specifically, a diaphragm pump may be used for the second circulation pump 1004. Instead of the second circulation pump 1004, a water head tank arranged to generate a prescribed water head difference with respect to the negative pressure control unit 230 may be used.

As shown in FIG. 2, the negative pressure control unit 230 includes the two negative pressure adjustment mechanisms for which different control pressures from each other are set. Between the two negative pressure control mechanisms, the side with a relatively high-pressure setting (indicated by "H" in FIG. 2) and the side with a relatively low-pressure setting (indicated by "L" in FIG. 2) are respectively connected to the common supply path 211 and the common recovery path 212 of the liquid ejection unit 300 via the liquid supply unit 220. The liquid ejection unit 300 has individual flow paths 215 (an individual supply path 213 and an individual recovery path 214) in communication with the common supply path 211, the common recovery path 212, and the recording element substrates. The common supply path 211 is connected with the negative pressure control mechanism H, the common recovery path 212 is connected with the negative pressure control mechanism L, and a differential pressure is generated between these two common flow paths. The individual flow paths 215 are in communication with the common supply path 211 and the common recovery path 212, and therefore the flow of a part of the ink from the common supply path 211 to the common recovery path 212 is generated through the internal flow paths of the recording element substrates 10 (see the arrows in FIG. 2).

In this way, in the liquid ejection unit 300, the flows of the liquid supplied to the common supply path 211 and the common recovery path 212 and the flow of a part of the ink through each of the recording element substrates 10 are generated. Therefore, the heat generated in each of the recording element substrates 10 can be discharged to the outside of the recording element substrate 10 by the ink passed through the common supply path 211 and the common recovery path 212. When recording is carried out with the liquid ejection head 3, an ink flow can also be generated at an ejection outlet from which ink is not ejected and a pressure chamber. In this way, the ink flow can reduce the viscosity of thickened ink at the ejection outlet, so that the thickening of the ink can be reduced. Furthermore, the thickened ink and foreign matter in the ink can be discharged into the common recovery path 212. As a result, the liquid ejection head 3 according to the embodiment allows high-speed and high-quality recording to be maintained.

Description of Configuration of Liquid Ejection Head

Figure 3A:
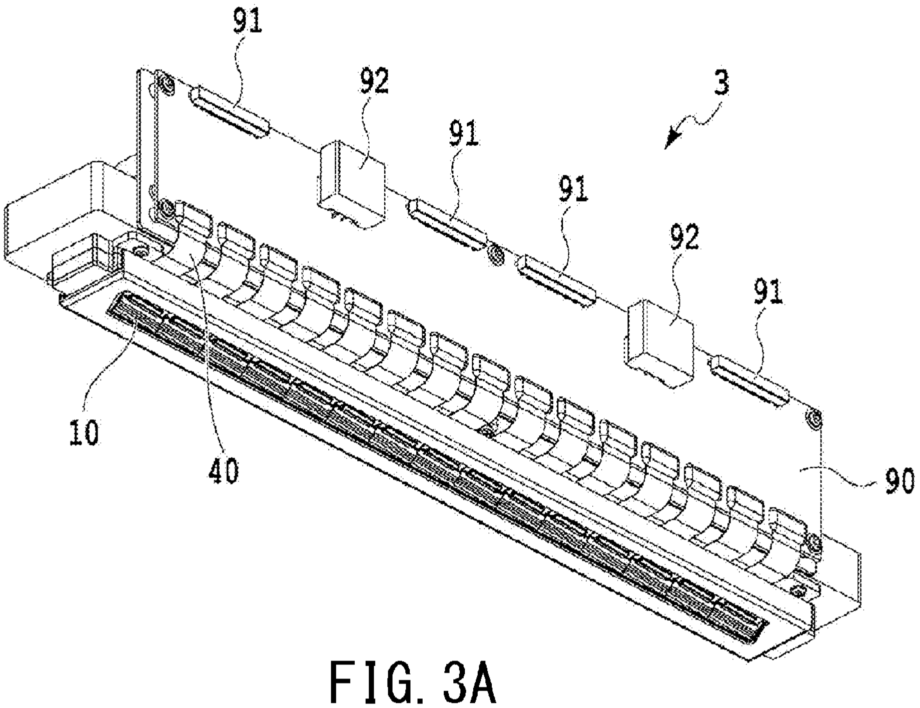
FIGS. 3A and 3B are perspective views of a liquid ejection head according to the first embodiment.
Figure 3B:
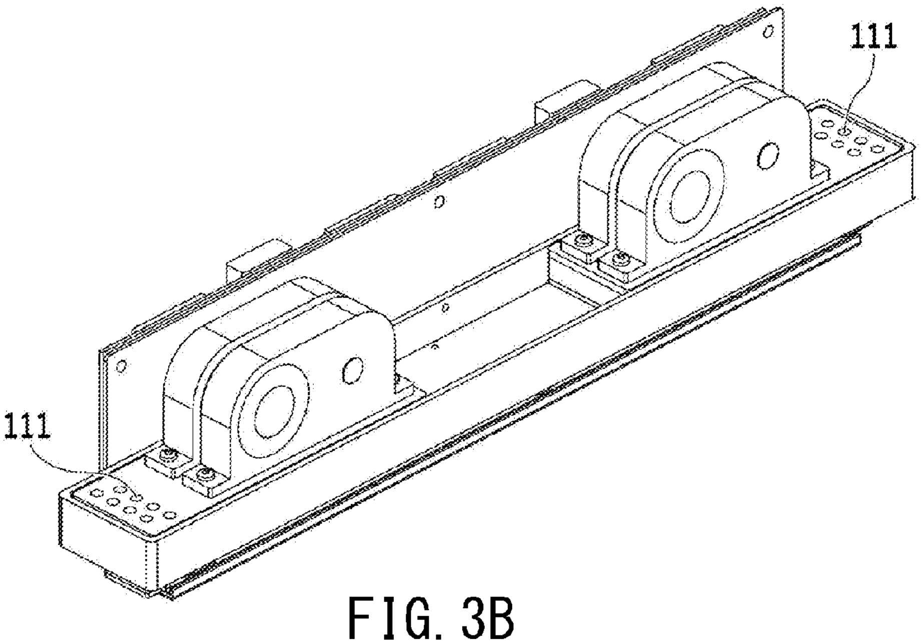

Now, the configuration of the liquid ejection head 3 will be described. FIGS. 3A and 3B are perspective views of the liquid ejection head 3. The liquid ejection head 3 is a so-called line type liquid ejection head including 15 recording element substrates 10, each of which can eject ink in four colors (cyan, magenta, yellow, and black), arranged in a straight line (inline arrangement). As shown in FIG. 3A, the liquid ejection head 3 includes the recording element substrates 10, flexible circuit boards 40, and signal input terminals 91 and power supply terminals 92 electrically connected through an electrical circuit board 90. The signal input terminals 91 and the power supply terminals 92 are electrically connected to the control unit of the recording device 1000. The signal input terminals 91 each supply an ejection driving signal which controls ejection operation to the recording element substrate 10, and the power supply terminals 92 each supply power necessary for ejection to the recording element substrate 10.

The number of the signal input terminals 91 and the power supply terminals 92 can be smaller than the number of the recording element substrates 10 by bringing together the wirings by the electrical circuit in the electrical circuit board 90. In this way, when the liquid ejection head 3 is assembled in the recording device 1000 or when the liquid ejection head 3 is replaced, the number of electrical connections which should be removed can be reduced. As shown in FIG. 3B, the liquid connection parts 111 provided at opposed ends of the liquid ejection head 3 are connected to the liquid supply path of the recording device 1000. In this way, the ink in four colors, cyan, magenta, yellow, and black is supplied to the liquid ejection head 3 via the liquid supply path of the recording device 1000, and the ink that has passed through the liquid ejection head 3 is recovered by the liquid supply path of the recording device 1000. In this way, ink in each color is allowed to circulate through the liquid supply path of the recording device 1000 and the liquid path of the liquid ejection head 3.

Figure 4:
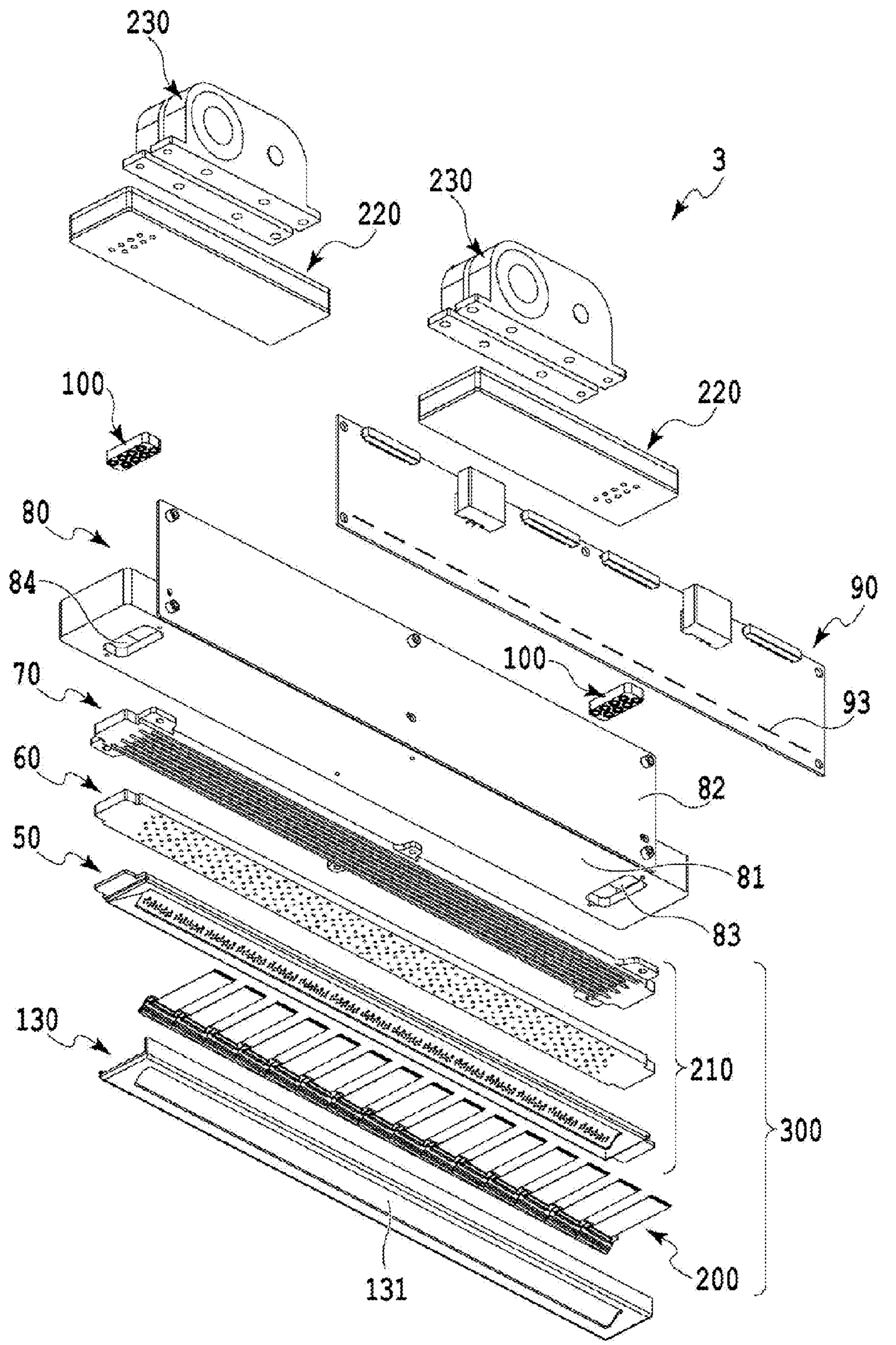
FIG. 4 is an exploded perspective view of the liquid ejection head according to the first embodiment.

FIG. 4 is an exploded perspective view of the components or units of the liquid ejection head 3. The liquid ejection head 3 has the case 80, and the liquid ejection unit 300, the liquid supply unit 220, and the electrical circuit board 90 are attached to the case 80. The liquid supply unit 220 is provided with liquid connection parts 111 (see also FIG. 2, FIG. 3A, and FIG. 3B), and filters 221 (see also FIG. 2) for the respective colors to remove foreign matter in the supplied ink are provided in the liquid supply unit 220. The filters 221 are in communication with corresponding openings of the liquid connection parts 111.

The two liquid supply units 220 each have filters 221 for two colors. The ink passed through the filter 221 is supplied to the negative pressure control unit 230 placed on the liquid supply unit 220 corresponding to the color. The negative pressure control unit 230 includes a negative pressure control valve for each color and reduces pressure loss change at the supply system (the supply system upstream of the liquid ejection head 3) of the recording device 1000 caused by changes in the ink flow rate by the function of valves and spring members provided in the units. In this way, the negative pressure control unit 230 can keep changes in the negative pressure downstream of the negative pressure control unit 230 (on the side of the liquid ejection unit 300) stable within a certain range.

The negative pressure control unit 230 for each color includes two negative pressure control valves for each ink color as shown in FIG. 2. The two negative pressure valves are set to different control pressures, the high-pressure side is in communication with the common supply path 211 in the liquid ejection unit 300 (see FIG. 2), and the low-pressure side is in communication with the common recovery path 212 (see FIG. 2) through the liquid supply unit 220.

The case 80 includes a support 81 for the liquid ejection unit 300 and a support 82 for the electrical circuit board 90 and ensures the rigidity of the liquid ejection head 3 while supporting the liquid ejection unit 300 and the electrical circuit board 90. The support 82 for the electrical circuit board 90 supports the electrical circuit board 90 and is screwed to the support 81 for the liquid ejection unit 300. The support 81 for the liquid ejection unit 300 corrects warpage and deformation of the liquid ejection unit 300, serves to ensure the accuracy of the relative position of the plurality of recording element substrates 10, and reduces ink streaking and unevenness on the recording medium. Therefore, the support 81 for the liquid ejection unit 300 preferably has sufficient rigidity, and the material therefor is preferably a metal such as SUS (Steel Use Stainless) and aluminum or ceramic such as alumina. The support 81 for the liquid ejection unit 300 is provided with openings 83 and 84 into which a joint rubber member 100 is inserted. Ink supplied from the liquid supply unit 220 is guided, through the joint rubber member 100, to a third flow path member 70 as a part of the liquid ejection unit 300.

The liquid ejection unit 300 includes a plurality of ejection modules 200 and flow path members 210, and a cover member 130 is attached to the surface of the liquid ejection unit 300 on the recording medium side. The cover member 130 has a frame-shaped surface with a long opening 131, and the recording element substrates 10 and a sealing member 110 (see also FIGS. 8A and 8B below) included in the ejection module 200 are exposed through the opening 131. The frame around the opening 131 serves as an abutment surface for a cap member that caps the liquid ejection head 3 during a recording standby period. Therefore, the cover member 130 is preferably configured to apply for example an adhesive, a sealant, or a filler along the periphery of the opening 131 to fill irregularities and gaps on the ejection outlet surface of the liquid ejection unit 300, so that a closed space is formed when capped.

Now, the configuration of the flow path member 210 of the liquid ejection unit 300 will be described. The flow path member 210 includes a first flow path member 50, a second flow path member 60, and the third flow path member 70 stacked on each other and distributes ink supplied from the liquid supply unit 220 to the ejection modules 200 corresponding to the respective colors. The flow path member 210 also returns ink returned from the ejection module 200 to the liquid supply unit 220. The flow path member 210 is screwed to the support 81 for the liquid ejection unit 300, which reduces warping and deformation of the flow path member 210. The flow path member 210 corresponds to a liquid supply member that supplies liquid to the plurality of flow paths through a plurality of communication holes of the cover member.

Figure 5A:
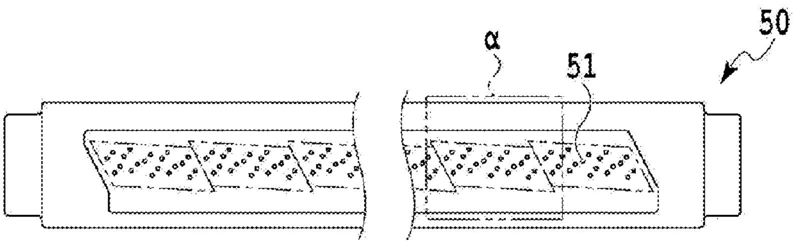
FIGS. 5A to 5F are views of the configuration of a flow path member according to the first embodiment.
Figure 5B:
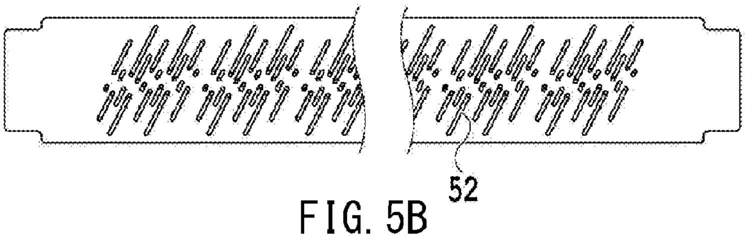
Figure 5C:
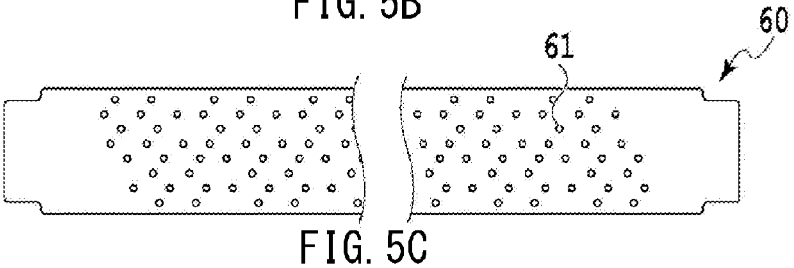
Figure 5D:
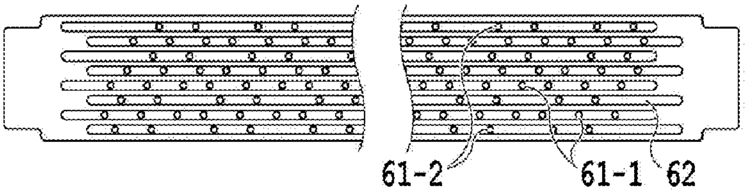
Figure 5E:
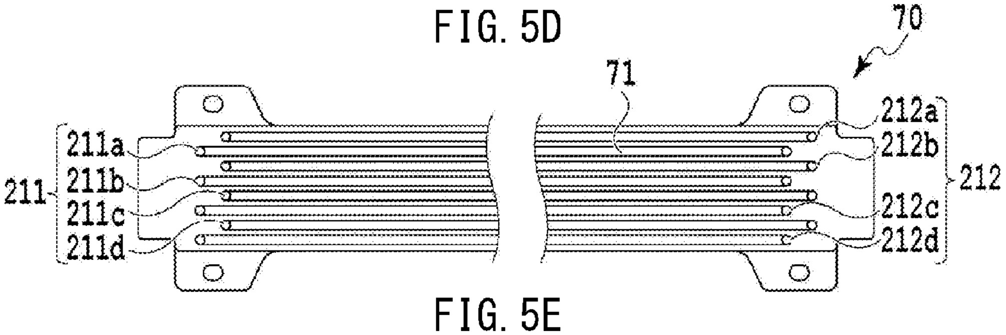
Figure 5F:
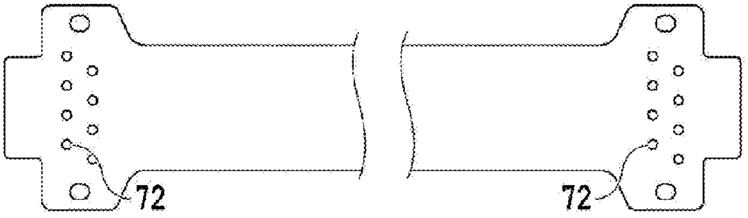

FIGS. 5A to 5F are views of the front and back surfaces of the first flow path member 50 (FIGS. 5A and 5B), the second flow path member 60 (FIGS. 5C and 5D) and the third flow path member 70 (FIG. 5E, FIG. 5F). FIG. 5A shows the surface of the first flow path member 50 on which the ejection modules 200 are mounted. FIG. 5B shows the back surface of the first flow path member 50 in abutment against the front surface of the second flow path member 60. FIG. 5C shows the front surface of the second flow path member 60 in abutment against the back surface of the first flow path member 50. FIG. 5D shows the back surface of the second flow path member 60 in abutment against the front surface of the third flow path member 70. FIG. 5E shows the front surface of the third flow path member 70 in abutment against the back surface of the second flow path member 60. FIG. 5F shows the back surface of the third flow path member 70 in abutment against the support 81 for the liquid ejection unit 300.

According to the embodiment, the back surface of the first flow path member 50 (FIG. 5B) and the front surface of the second flow path member 60 (FIG. 5C) are joined to oppose each other, and the back surface of the second flow path member 60 (FIG. 5D) and the front surface of the third flow path member 70 (FIG. 5E) are joined to oppose each other. The second flow path member 60 and the third flow path member 70 are also joined. As a result, from common flow path grooves 62 and 71 formed in the flow path members, eight common flow paths (211*a*, 211*b*, 211*c*, 211*d*, 212*a*, 212*b*, 212*c*, and 212*d*) extending in the longitudinal direction of the flow path members are formed. In this way, a set of a common supply path 211 and a common recovery path 212 is formed for each ink color in the flow path member 210.

Ink is supplied to the liquid ejection head 3 from the common supply path 211, and the ink supplied to the liquid ejection head 3 is recovered by the common recovery path 212. The commination holes 72 of the third flow path member 70 are in communication with holes of the joint rubber member 100 and are in fluid communication with the liquid supply unit 220 (see FIG. 4). As shown in FIG. 5D, at the bottom of the common flow path grooves 62 of the second flow path member 60, a plurality of communication holes 61 (communication holes 61-1 in communication with the common supply path 211 and communication holes 61-2 in communication with the common recovery path 212) are formed. Each of the communication holes 61 is in communication with one end of one of individual flow path grooves 52 of the first flow path member 50 shown in FIG. 5B. As shown in FIG. 5A, communication holes 51 are formed at the other ends of the individual flow path grooves 52 of the first flow path member 50, and each of the individual flow path grooves 52 is in fluid communication with the ejection module 200 through a corresponding communication hole 51. The presence of the individual flow path grooves 52 allows the flow paths to be brought together at the center of the flow path members.

The first flow path member 50, the second flow path member 60, and the third flow path member 70 are preferably made of a material that has corrosion resistant to liquid and a low linear expansion coefficient. An example of a preferable material for the flow path members is a composite material (resin material) including a base material such as alumina, LCP (liquid crystal polymer), PPS (polyphenyl sulfide), PSF (polysulfone) and modified PPE (polyphenylene ether) and an inorganic filler as an additive. Examples of the inorganic fillers include silica fine particles and fiber. As for a method for forming the flow path member 210, the first flow path member 50, the second flow path member 60, and the third flow path member 70 may be stacked and adhered to each other, or when a composite material (resin material) is selected as the material, these members may be joined together by welding.

Figure 6:
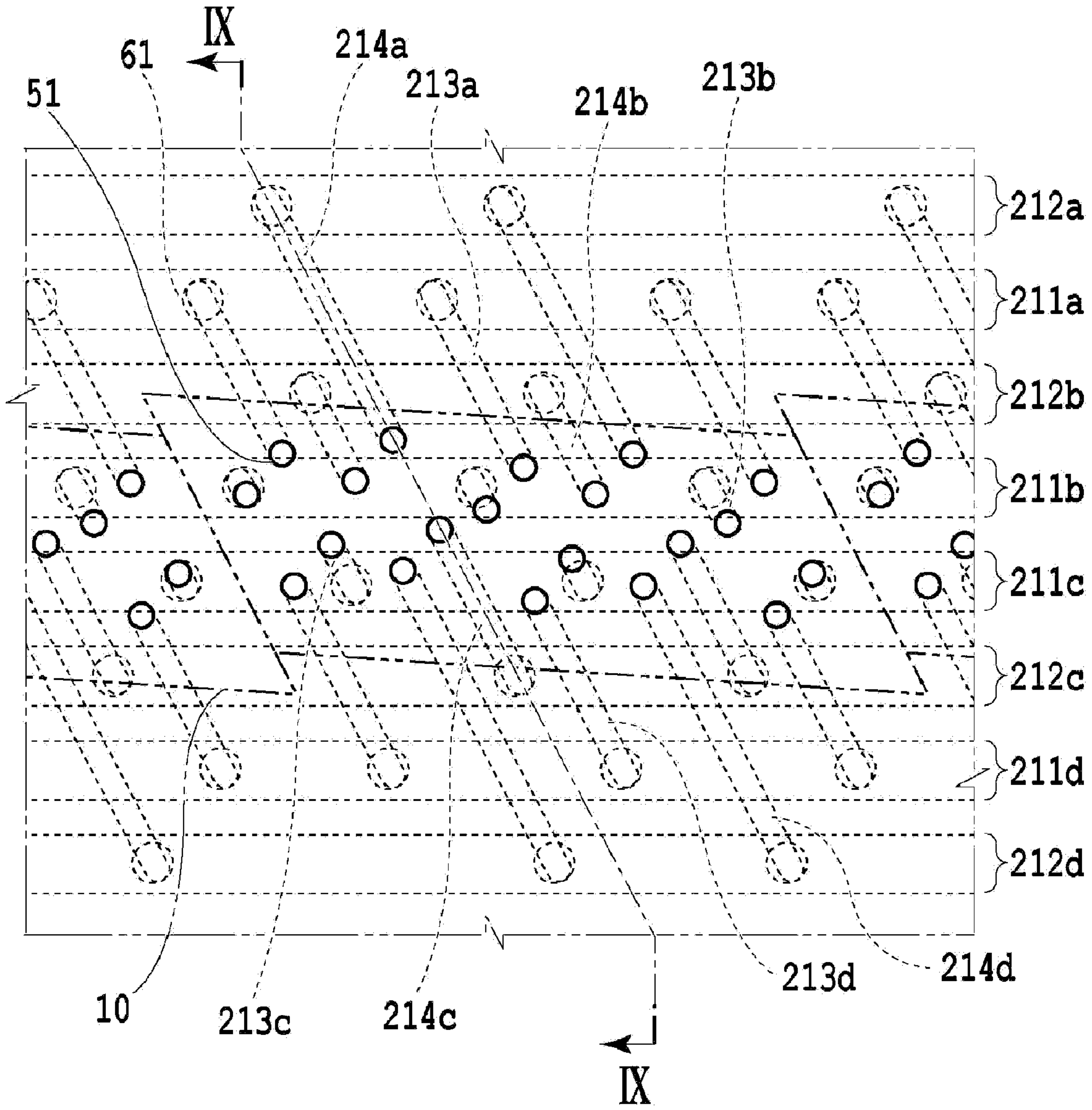
FIG. 6 is an enlarged view of a part surrounded by a rectangle a in FIG. 5A.

FIG. 6 is an enlarged view of a part surrounded by the rectangle a in FIG. 5A illustrating the flow path in the flow path member 210 in which the first to third flow path members are stacked on each other in a perspective view from the front surface side of the first flow path member 50. As shown in FIG. 6, the flow path member 210 is provided with the common supply paths 211 (211*a*, 211*b*, 211*c*, and 211*d*) and common recovery paths 212 (212*a*, 212*b*, 212*c*, and 212*d*) extending in the longitudinal direction of the liquid ejection head 3 for each ink color.

More specifically, the common supply paths 211 for the respective colors are in communication with a plurality of individual supply paths 213 (213*a*, 213*b*, 213*c*, and 213*d*) formed by the individual flow path grooves 52 through communication holes 61. The common recovery paths 212 for the respective colors are in communication with a plurality of individual recovery paths 214 (214*a*, 214*b*, 214*c*, and 214*d*) formed by the individual flow path grooves 52 through the communication holes 61. With the flow path arrangement, ink can be brought together to the recording element substrates 10 located in the center of the flow path member from the common supply paths 211 through the individual supply paths 213. The ink supplied to the recording element substrates 10 can be recovered through the individual recovery paths 214 to the common recovery paths 212.

Figure 7:
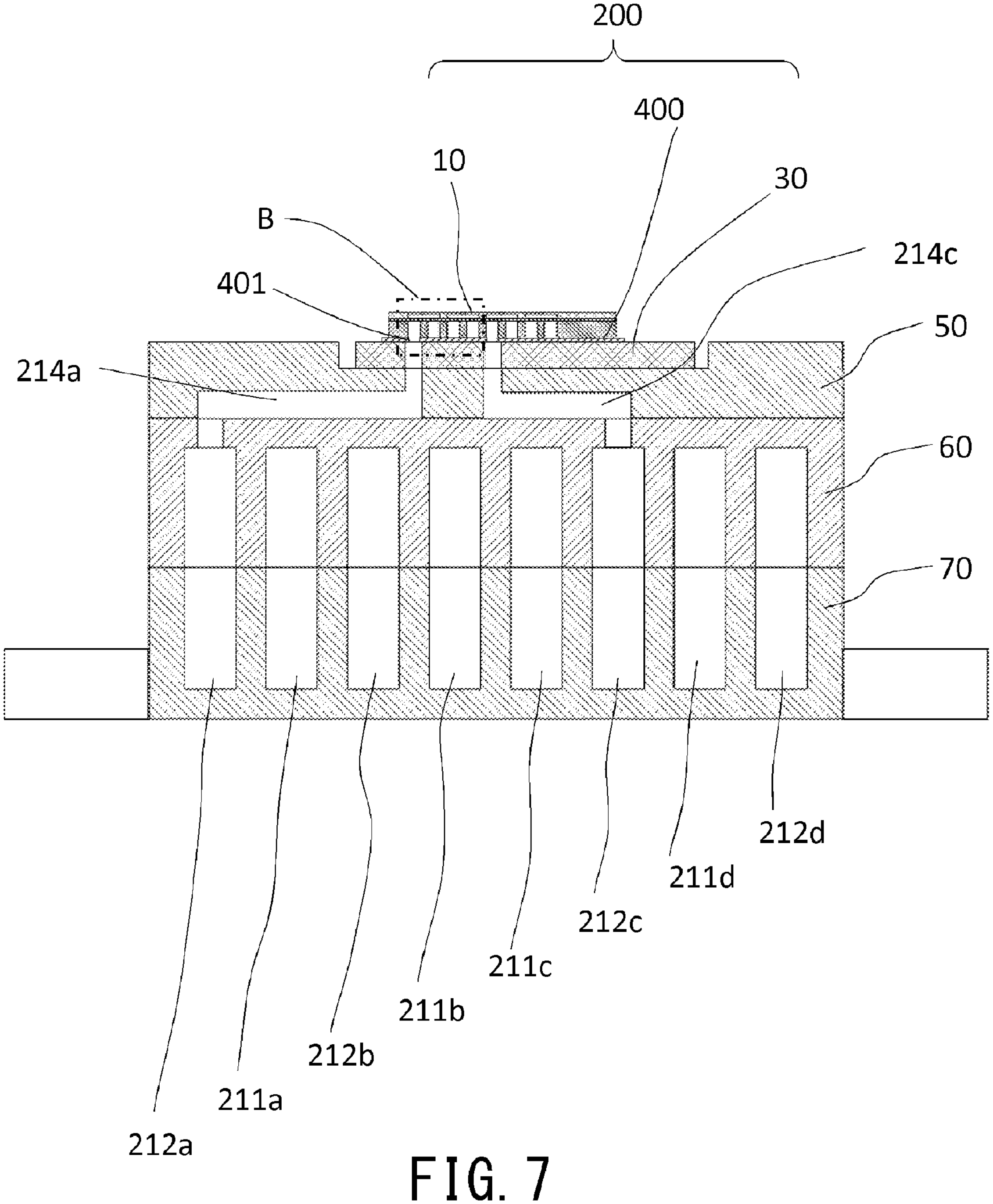
FIG. 7 is a sectional view taken a long line IX-IX in FIG. 6.

FIG. 7 is a sectional view taken along line IX-IX in FIG. 6. As shown in FIG. 7, the individual recovery paths 214*a* and 214*c* are in communication with the ejection module 200 through the communication holes 51. Note that FIG. 7 shows the individual recovery paths 214*a* and 214*c* only, but in another section of the flow path member 210 in FIG. 6, the individual supply paths 213 are also in communication with the ejection module 200. A support member 30 and the recording element substrate 10 included in each ejection module 200 have flow paths for supplying ink from the first flow path member 50 to a recording element 15 provided at the recording element substrate 10.

Furthermore, the support member 30 and the recording element substrate 10 each include a flow path for recovering (returning) ink, in part or in whole, supplied to the recording element 15 to the first flow path member 50. The recording element substrate 10 and the support member 30 are joined by an adhesive member 400 which will be described. The adhesive member 400 has openings 401 which correspond to communication holes 31 (FIG. 8B) provided at the support member 30 and communication holes 21 (see FIG. 9C) provided at the cover member 20 (see FIG. 9C). The adhesive member 400 is preferably made of a material that has high adhesion with the substrate 11, the cover member 20, and the support member 30 and corrosion resistance and permeation resistance to liquid such as an epoxy adhesive, more preferably a material containing a silane agent. In this way, the adhesion between the adhesive member 400 and the substrate 11 or the cover member 20 can be even more increased when the substrate 11 is made of a silicon substrate or the cover member 20 is made of an epoxy resin material.

Here, the common supply path 211 is connected to the negative pressure control unit 230 (on the high-pressure side) for the corresponding color ink through the liquid supply unit 220. The common recovery path 212 is connected to the negative pressure control unit 230 (on the low-pressure side) through the liquid supply unit 220. The negative pressure control unit 230 generates a differential pressure (pressure difference) between the common supply path 211 and the common recovery path 212. Therefore, as shown in FIGS. 6 and 7, in the liquid ejection head 3 in which the flow paths are in fluid communication, ink in each color is supplied to the common supply path 211, the individual supply path 213, the recording element substrate 10, the individual recovery path 214, and the common recovery path 212 in this order.

Description of Ejection Module

Figure 8A:
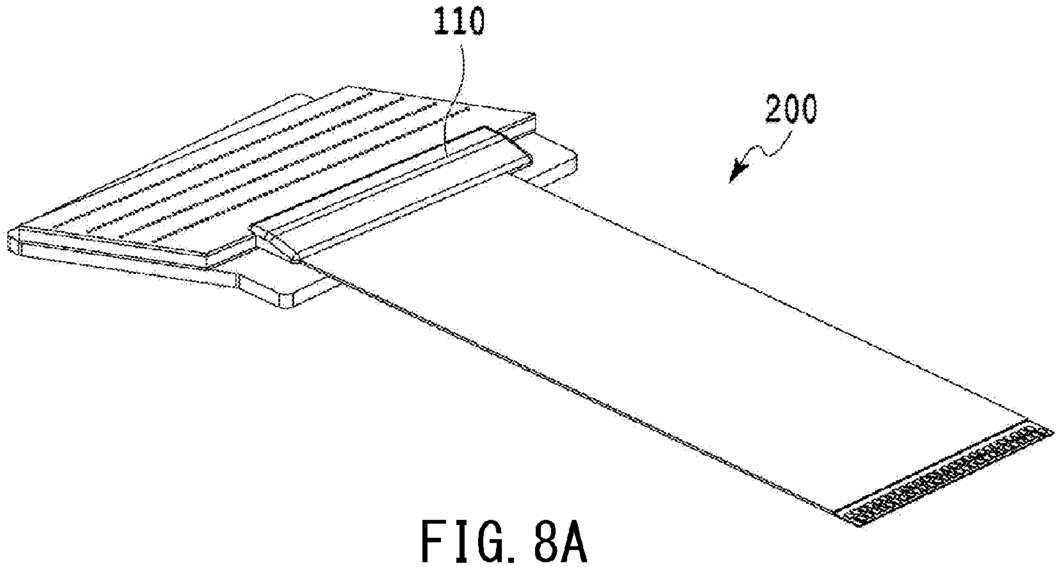
FIG. 8A is a perspective view of an ejection module.
Figure 8B:
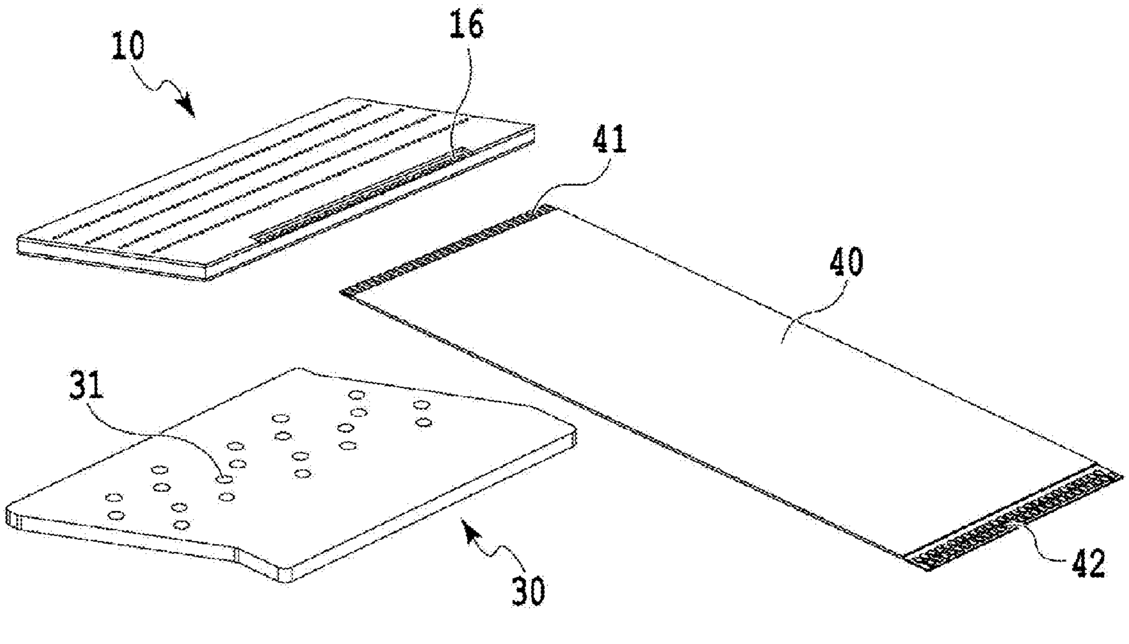
FIG. 8B is an exploded view of the ejection module.

FIG. 8A is a perspective view of one ejection module 200, and FIG. 8B is an exploded view of the module 200. In order to manufacture the ejection module 200, the recording element substrate 10 and a flexible circuit board 40 are adhered to the support member 30 provided with the communication holes 31 in advance with the adhesive member 400. Then, a terminal 16 on the recording element substrate 10 and a terminal 41 on the flexible circuit board 40 are electrically connected by wire-bonding, and the wire-bonded part (electrical connection part) is covered and sealed with the sealing member 110. A terminal 42 of the flexible circuit board 40 on the opposite side to the recording element substrate 10 is electrically connected to the connection terminal 93 (see also FIG. 4) of the electrical circuit board 90. The support member 30 supports the recording element substrate 10 and also allows the recording element substrate 10 and the flow path member 210 to be in fluid connection. Therefore, the support member 30 preferably has high flatness and can be joined with the recording element substrate with sufficiently high reliability. For example, alumina or a resin material is preferably used as a material for the support member 30.

Description of Configuration of Recording Element Substrate

Figure 9A:
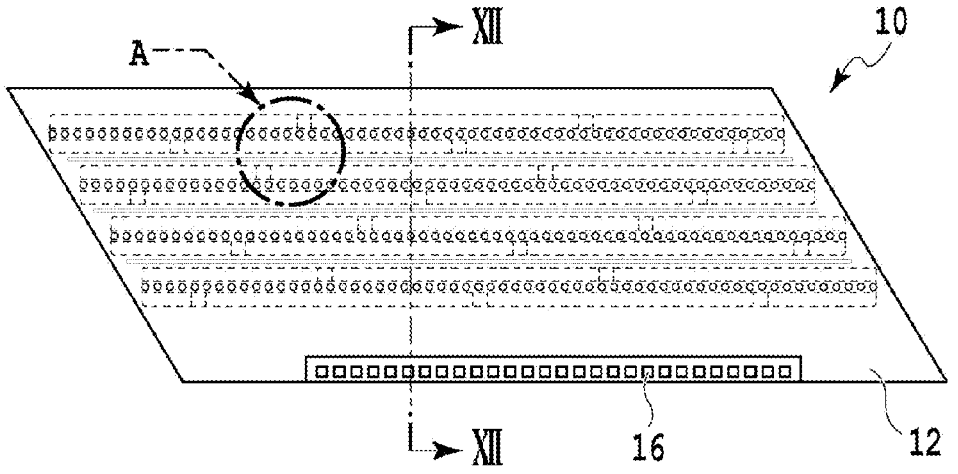
FIG. 9A is a plan view of a recording element substrate.
Figure 9B:
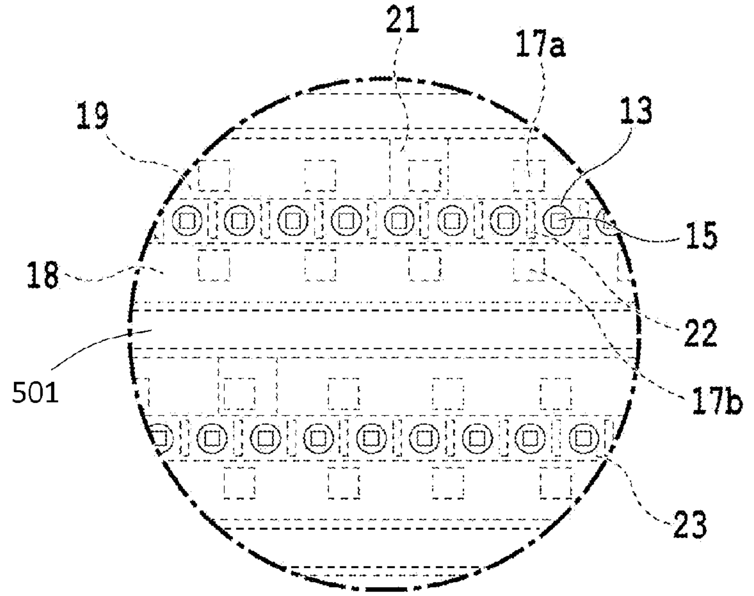
FIG. 9B is an enlarged view of a part indicated by a circle A in FIG. 9A.
Figure 9C:
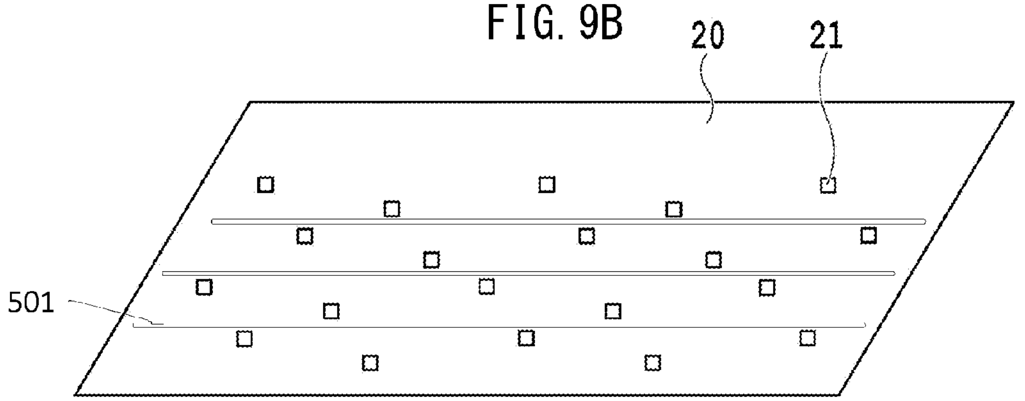
FIG. 9C is a plan view of the back surface of the recording element substrate.

FIG. 9A is a plan view of the surface of the recording element substrate 10 provided with the ejection outlets 13 (the surface of the recording element substrate 10). FIG. 9B is an enlarged view of the part indicated by the circle A in FIG. 9A. FIG. 9C is a plan view of the back surface of the recording element substrate 10. Now, the configuration of the recording element substrate 10 according to the embodiment will be described. As shown in FIG. 9A, the flat plate-shaped ejection outlet forming member 12 of the recording element substrate 10 has four rows of ejection outlets 13 corresponding to the ink colors. In the following description, the direction in which the ejection outlets 13 are arranged in each row is referred to as the "row direction of the ejection outlet row."

As shown in FIG. 9B, the recording element 15 which is a heat-generating device for foaming liquid with thermal energy is provided at a position corresponding to each of the ejection outlets 13. A pressure chamber 23 each provided with the recording element 15 therein is defined by a partition wall 22. The recording element 15 is electrically connected to the terminal 16 by an electrical wiring (not shown) provided at the recording element substrate 10. The recording element 15 generates heat in response to a pulse signal input from the control circuit of the recording device 1000 through the electrical circuit board 90 (see also FIG. 4) and the flexible circuit board 40 (see also FIG. 8B) and boils the ink. This causes film boiling of the ink. The ink is ejected from the ejection outlet 13 using the pressure of bubbles generated by the film boiling phenomenon of the ink. As shown in FIG. 9B, in the row direction of the ejection outlet row, a liquid supply path 18 as a flow path portion for supplying ink is provided on one side and a liquid recovery path 19 as a flow path portion for recovering ink is provided on the other side so that the row of ejection outlets 13 is sandwiched between the paths. The liquid supply path 18 and the liquid recovery path 19 are flow paths extending in the row direction of the ejection outlet row provided at the recording element substrate 10 and are in communication with the ejection outlet 13 through a supply opening 17*a* and a recovery opening 17*b*, respectively.

As shown in FIG. 9C, the sheet-like cover member 20 is placed on the back surface of the recording element substrate 10, and the cover member 20 has the plurality of communication holes 21 in communication with the liquid supply path 18 and the liquid recovery path 19. According to the embodiment, the cover member 20 has three communication holes 21 provided for one liquid supply path 18 and two communication holes 21 are provided for one liquid recovery path 19. As shown in FIG. 9B, the communication holes 21 provided at the cover member 20 are in communication with a plurality of communication holes 31 shown in FIG. 8B. The material of the cover member 20 can be a silicon substrate or an epoxy resin material. An adhesive member may be provided between the back surface of the recording element substrate 10 and the cover member 20.

The cover member 20 is preferably corrosion resistant to ink, and the shape and position of the opening of the communication hole 21 must be highly precise from the viewpoint of preventing ink color mixing. Therefore, it is preferable to use a photosensitive resin material as the material for the cover member 20 and to provide the communication holes 21 by a photolithography process. In this way, in the cover member 20, the flow path pitch can be converted by the communication holes 21, and the cover member 20 preferably has a small thickness and is made of a film type member in consideration of pressure drop. When an adhesive member is provided between the recording element substrate 10 and the cover member 20, the adhesive member which adheres the recording element substrate 10 and the support substrate preferably has a higher adhesive strength than that of the adhesive member for adhering the cover member.

According to the embodiment, in the cover member 20, a plurality of slits 501 are provided in a position opposed to the part between the liquid supply path 18 and the liquid recovery path 19 of the recording element substrate 10. The slits 501 may be formed by a photolithography process or by a thermal and/or physical process such as laser processing and sandblasting. As an example, the slit 501 has a width of 150 μm. The slit 501 corresponds to a cover member opening formed at least at a part of the abutment region of the cover member in abutment against the substrate, apart from the region with the plurality of communication holes, and the adhesive member and the substrate are in communication in the slits 501.

Figure 10:
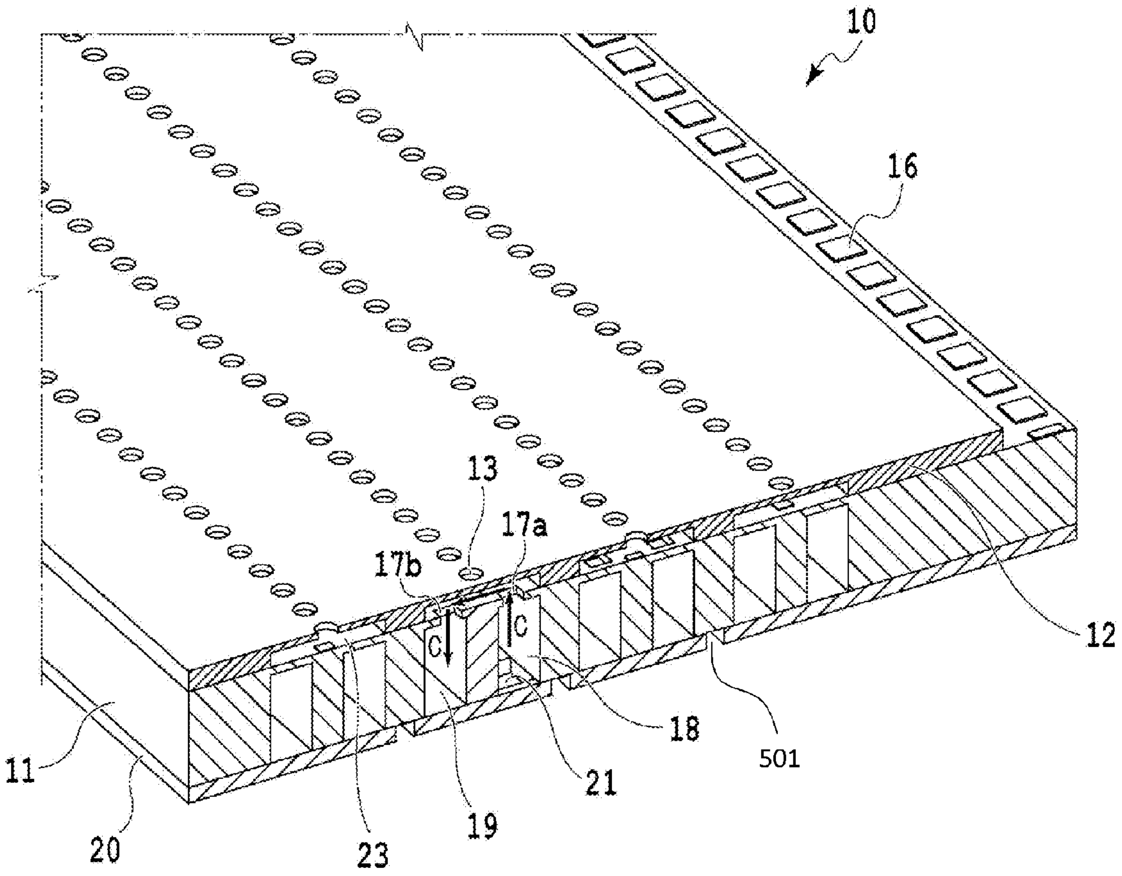
FIG. 10 is a perspective view of a section taken along XII-XII in FIG. 9A.

FIG. 10 is a perspective view showing a cross section of the recording element substrate 10 and the cover member 20 taken along line XII-XII in FIG. 9A. With reference to FIG. 10, the flow of liquid within the recording element substrate 10 will be described. The cover member 20 serves as a cover which forms a part of the walls of the liquid supply path 18 and the liquid recovery path 19 formed at the substrate 11 of the recording element substrate 10.

The recording element substrate 10 includes the substrate 11 of silicon (Si) as an example and the ejection outlet forming member 12 made of photosensitive resin is stacked thereon, and the cover member 20 is joined to the back surface of the substrate 11. The recording element 15 is formed on the front surface of the substrate 11 (see FIG. 9B), and grooves for forming the liquid supply path 18 and the liquid recovery path 19 that extend along the row of ejection outlets are formed on the back surface of the substrate 11. In this way, the substrate 11 has a plurality of flow paths for the liquid to be ejected onto a recording material by the recording element. The liquid supply path 18 and the liquid recovery path 19 are also the substrate openings of the flow paths formed on the surface against which the cover member abuts. The cover member 20 has a plurality of communication holes in communication with the plurality of flow paths and is joined to the substrate 11.

The liquid supply path 18 and the liquid recovery path 19 formed by the substrate 11 and the cover member 20 are connected to the common supply path 211 and the common recovery path 212, respectively in the flow path member 210, and a pressure difference is generated between the liquid supply path 18 and the liquid recovery path 19. While recording is carried out with ink ejected from the ejection outlets 13, at the ejection outlets 13 from which the ink is not ejected, the differential pressure causes the ink in the liquid supply path 18 to be passed through the supply opening 17*a*, the pressure chamber 23, and the recovery opening 17*b* to the liquid recovery path 19 (the arrows C in FIG. 10). The flow of the ink allows ink thickened by evaporation of ink from the ejection outlet 13, bubbles, and foreign matter in the ejection outlet 13 without ejection operation or the pressure chamber 23 to be recovered into the liquid recovery path 19. It is also advantageous in that ink is less likely to thicken at the ejection outlets 13 and the pressure chamber 23.

The ink recovered into the liquid recovery path 19 is passed to the communication holes 51 of the flow path member 210, the individual recovery path 214, and the common recovery path 212 in the order through the communication holes 21 of the cover member 20 and the liquid communication holes 31 of the support member 30 (see FIG. 8B) and is recovered into the recovery path of the recording device 1000.

The cover member 20 also has a plurality of slits 501 in a position opposed to the part between the liquid supply path 18 and the liquid recovery path 19 at the substrate 11. The ink flows into the liquid ejection head 3 from the liquid connection parts 111 of the liquid supply unit 220. The ink then flows into the joint rubber member 100, the communication hole 72 and the common flow path groove 71 provided at the third flow path member 70, the common flow path groove 62 and the communication hole 61 provided at the second flow path member 60, and the individual flow path groove 52 and the communication holes 51 provided at the first flow path member 50 in the order. The ink then flows through the liquid communication hole 31 at the support member 30, the communication hole 21 provided at the cover member 20, the liquid supply path 18 and the supply opening 17*a* provided at substrate 11 in this order and is supplied to the pressure chamber 23.

The part of the ink supplied to the pressure chamber 23 which is not ejected from the ejection outlet 13 flows to the recovery opening 17*b* and the liquid recovery path 19 provided at the substrate 11, the communication hole 21 provided at the cover member 20, and the liquid communication hole 31 provided at the support member 30 in this order. The liquid then flows through the communication hole 51 and the individual flow path groove 52 provided at the first flow path member, the communication hole 61 and the common flow path groove 62 provided at the second flow path member, the common flow path groove 71 and the communication hole 72 provided at the third flow path member 70, and the joint rubber member 100 in this order. The ink then flows to the liquid connection parts 111 of the liquid supply unit 220 and to the outside of the liquid ejection head 3. In this way, in the liquid ejection head 3 according to the embodiment, thickening of ink in the pressure chamber 23 and the ejection outlet 13 can be reduced and therefore deviation in the direction of ink ejection or ink ejection failure can be reduced, so that high picture quality recording can be achieved.

Figure 11:
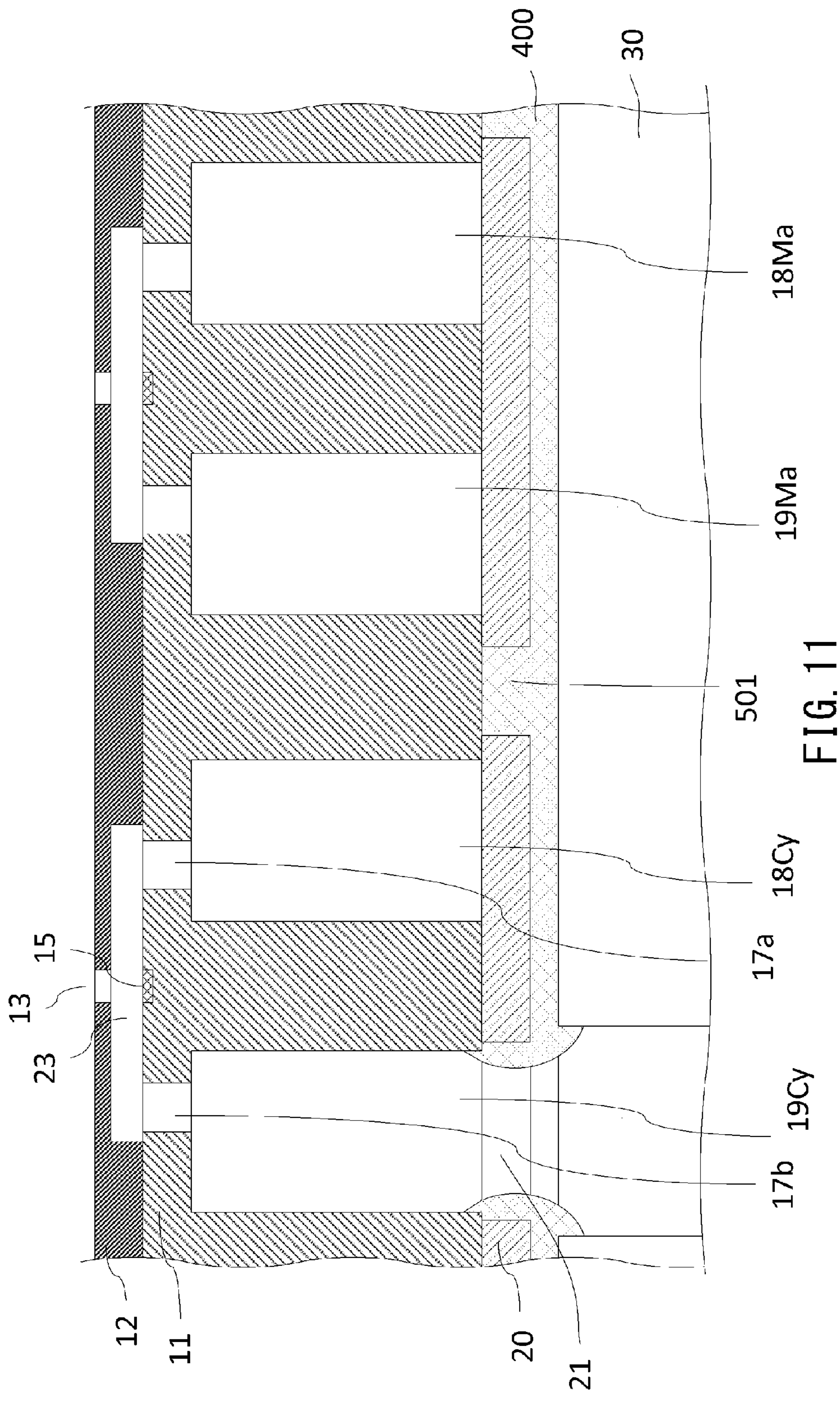
FIG. 11 is an enlarged view of a part indicated by a rectangle B in FIG. 7.

FIG. 11 is an enlarged view of the part indicated by the rectangle B in FIG. 7. As shown in FIG. 11, the recording element substrate 10 has a slit 501 in the cover member 20 between a liquid supply path 18Cy formed to supply cyan ink and a liquid recovery path 19Ma formed to recover magenta ink. The adhesion between the substrate 11 of Si which is an inorganic material and the cover member 20 of photosensitive resin which is an organic material is lower than the adhesion between the adhesive member 400 and each of these elements. According to the embodiment, the slit 501 is provided in the cover member 20 between the liquid supply path 18 and the liquid recovery path 19 for each color ink. This allows the substrate 11 to join to the adhesive member 400 with higher adhesion than the cover member 20 in the part provided with the slit 501. As a result, the possibility of interface delamination between the substrate 11 and the cover member 20 is reduced as compared to the case in which the substrate 11 is joined to the cover member 20, so that the possibility of ink color mixing in the ink flow paths formed at the substrate 11 can be suppressed.

In particular, the edge of the communication hole 21 provided at the cover member 20 overlaps the liquid supply path 18 and the liquid recovery path 19 of the substrate 11, and the communication hole 21 may be less rigid. In other words, it can be considered that interface delamination between the substrate 11 and the cover member 20 is likely to occur in the vicinity of the communication hole 21. However, according to the embodiment, if interface delamination occurs between the substrate 11 and the cover member 20 around the communication hole 21, the interface of the substrate 11 with the cover member 20 changes to the interface with the adhesive member 400 with higher adhesion at the slit 501. As a result, the interface delamination between the substrate 11 and the cover member 20 is suppressed by the presence of the adhesive member 400. This can reduce the possibility of ink color mixing attributable to communication between the flow paths for different color inks caused by interface delamination between the substrate 11 and the cover member 20.

In the above description of the embodiment, the liquid ejection head has two kinds of flow paths in the recording element substrate, i.e., the liquid supply path and the liquid recovery path. However, the above structure with the slits can also be applied to a liquid ejection head only with a liquid supply path provided on the recording element substrate if a cover member is provided on the backside of the recording element substrate and the substrate and the cover member are adhered by an adhesive.

Second Embodiment

Figure 12A:
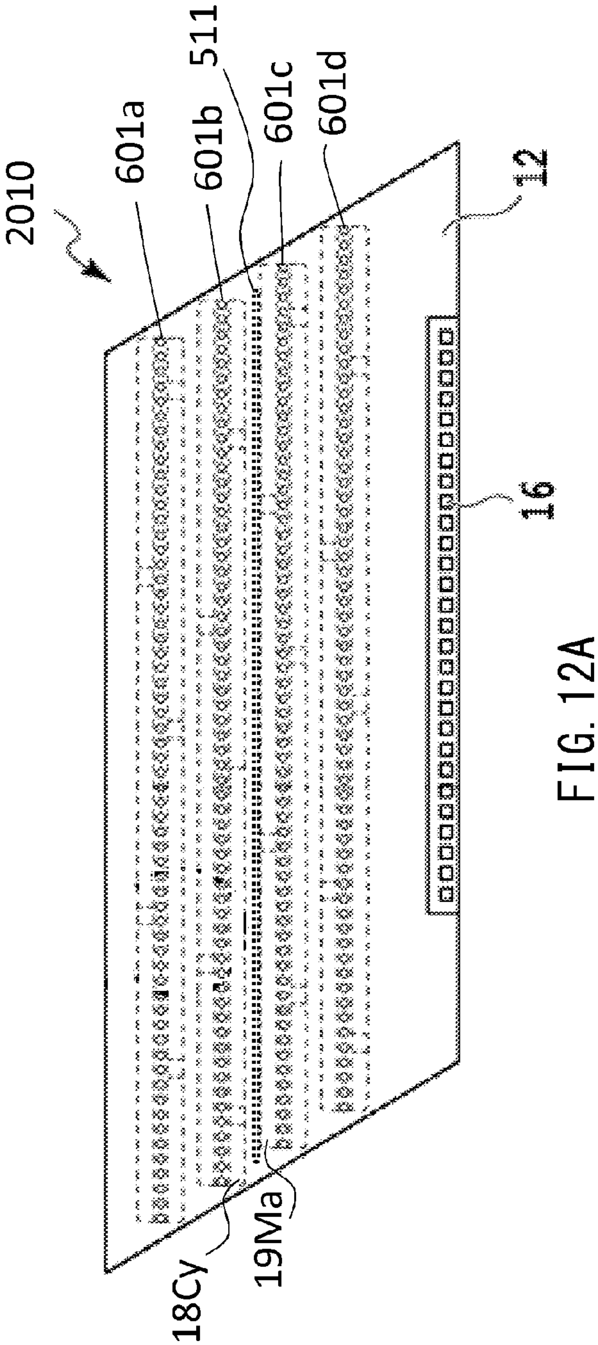
FIGS. 12A and 12B are plan views of a recording element substrate according to a second embodiment of the invention.
Figure 12B:
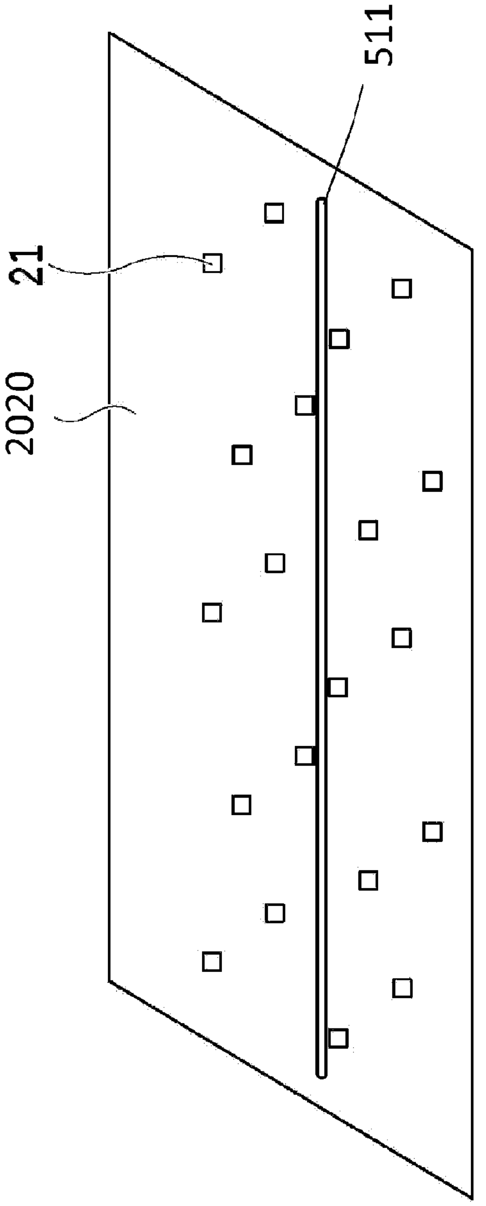

Now, the configuration of a liquid ejection head according to a second embodiment of the invention will be described. FIG. 12A is a plan view of the front surface of a recording element substrate 2010 provided with ejection outlets 13 according to the embodiment, and FIG. 12B is a plan view of the back surface of the recording element substrate 2010. The recording element substrate 2010 according to the embodiment has the same configuration as the first embodiment except for the slit which will be described. In the following description, the elements with the same configurations as those of the first embodiment will be designated by the same reference characters, and a detailed description thereof will not be provided.

As shown in FIG. 12A, the ejection outlet forming member 12 of the recording element substrate 2010 has four ejection outlet rows in total, i.e., two rows of ejection outlets 601*a* and 601*b* corresponding to cyan ink and two rows of ejection outlets 601*c* and 601*d* corresponding to magenta ink. The liquid supply path 18 and the liquid recovery path 19 extend in a direction parallel to the direction in which the ejection outlet rows formed at the substrate 11 of the recording element substrate 2010 extend. As shown in FIG. 11, the liquid supply path 18 and the liquid recovery path 19 are in communication with an ejection outlet 601*x* (x is one of a, b, c, and d) through a supply opening 17*a* and a recovery opening 17*b*, respectively. A liquid supply path 18Cy and a liquid recovery path 19Cy are flow paths for cyan ink and a liquid supply path 18Ma and a liquid recovery path 19Ma are flow paths for magenta ink. As shown in FIG. 12B, according to the embodiment, a cover member 2020 has a slit 511 as an opening in a position corresponding to the region of the substrate 11 between the liquid supply path 18Cy and the liquid recovery path 19Ma. The liquid supply path 18Cy and the liquid recovery path 19Cy correspond to a flow path for a first liquid, and the liquid supply path 18Ma and the liquid recovery path 19MA correspond to a flow path for a second liquid. The slit 511 corresponds to a cover member opening formed in a position corresponding to the region of the substrate between the flow path for the first liquid and the flow path for the second liquid among the plurality of flow paths.

According to the embodiment, in a plan view of the recording element substrate 2010, the cover member 2020 has the slit 511 in a position corresponding to the region between the two liquid supply paths as flow paths for ink in different colors formed at the substrate 11. In this way, the possibility of communication between the flow paths attributable to interface delamination between the substrate 11 and the cover member 2020 and ink color mixing can be reduced while reducing the man-hours required for processing the slit at the cover member.

Third Embodiment

Figure 13A:
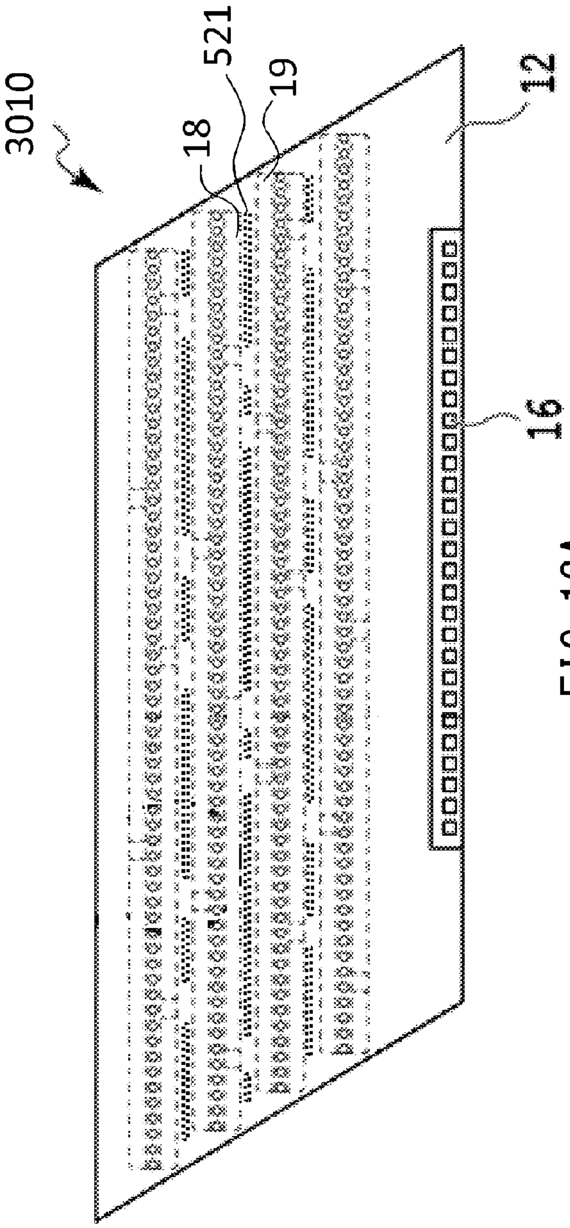
FIGS. 13A and 13B are plan views of a recording element substrate according to a third embodiment of the invention.
Figure 13B:
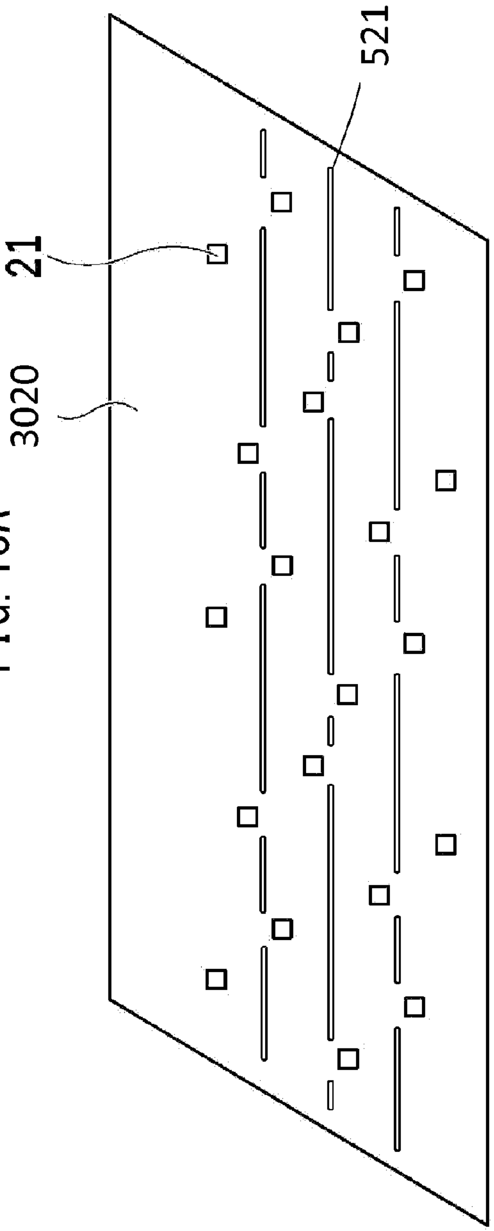

Now, the configuration of a liquid ejection head according to a third embodiment of the invention will be described. FIG. 13A is a plan view of the front surface of a recording element substrate 3010 provided with ejection outlets 13 according to the embodiment, and FIG. 13B is a plan view of the back surface of the recording element substrate 3010. The recording element substrate 3010 according to the embodiment has the same configuration as the first embodiment except for the slits which will be described. In the following description, the elements with the same configurations as those of the first embodiment will be designated by the same reference characters, and a detailed description thereof will not be provided.

As shown in FIG. 13B, in a plan view of the recording element substrate 3010, a cover member 3020 is provided with slits 521 in a position corresponding to the region of the substrate 11 between the liquid supply path 18 and the liquid recovery path 19. Each of the slits 521 is not formed for example, in an area within 50 μm from the opening edge of a communication hole 21 in the cover member 3020. In this way, according to the embodiment, the slits 521 are formed in a position excluding the area adjacent to the communication holes 21 in the cover member 3020.

According to the embodiment, in a plan view of the recording element substrate 3010, the direction in which the row of ejection outlets 13 extends is a reference direction. The liquid supply path 18 and the liquid recovery path 19 extend in the reference direction of the substrate 11. The slits 521 as cover member openings are formed in an area a predetermined distance apart from the communication holes 21.

According to the embodiment, the cover member 3020 is provided with the slits 521 at least a certain distance apart from the communication holes 21. In this way, the possibility of cracks or other defects in the cover member 3020 between the slits 521 and the cover member 3020 can be reduced. The slits 521 through which the bottom of the substrate 11 and the adhesive member 400 contact each other are formed between the liquid supply path 18 and the liquid recovery path 19 in a steppingstone manner in the direction of the row of the ejection outlets 13. Therefore, the effect of suppressing ink color mixing in the case of interface delamination starting from the periphery of any of the communication holes 21 of the cover member 3020 may be smaller than the first embodiment. However, since the adhesion between the substrate 11 and the cover member 3020 is increased as for the surface as a whole, the possibility of communication between the flow paths attributable to interface delamination between the substrate 11 and the cover member 3020 and ink color mixing can be reduced.

Fourth Embodiment

Figure 14A:
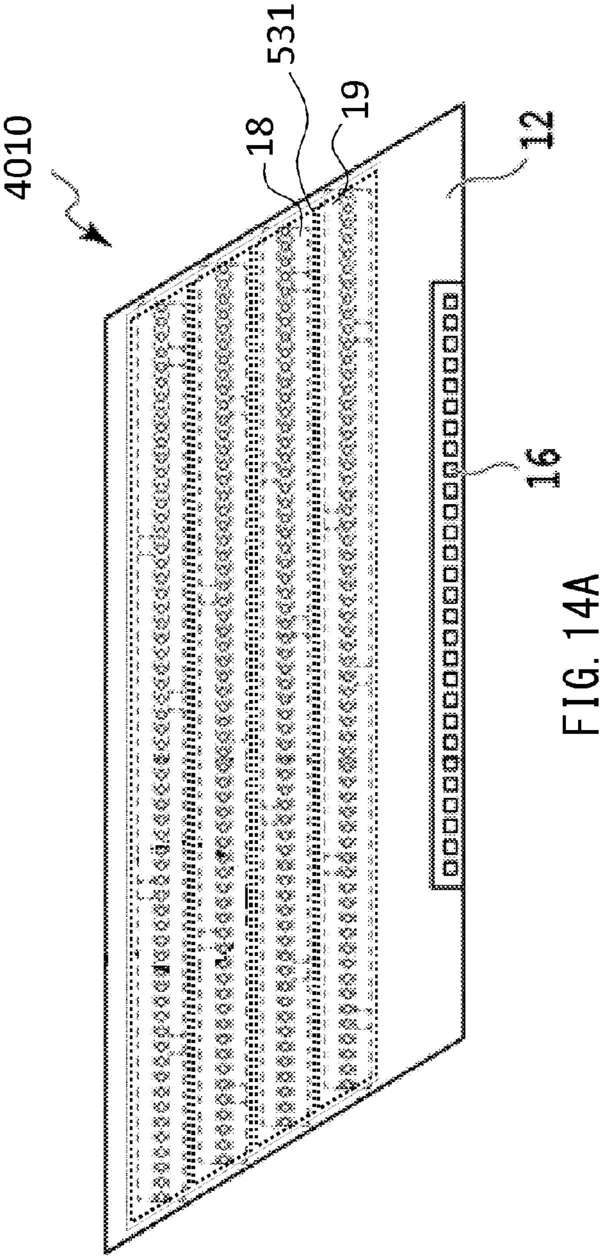
FIGS. 14A and 14B are plan views of a recording element substrate according to a fourth embodiment of the invention.
Figure 14B:
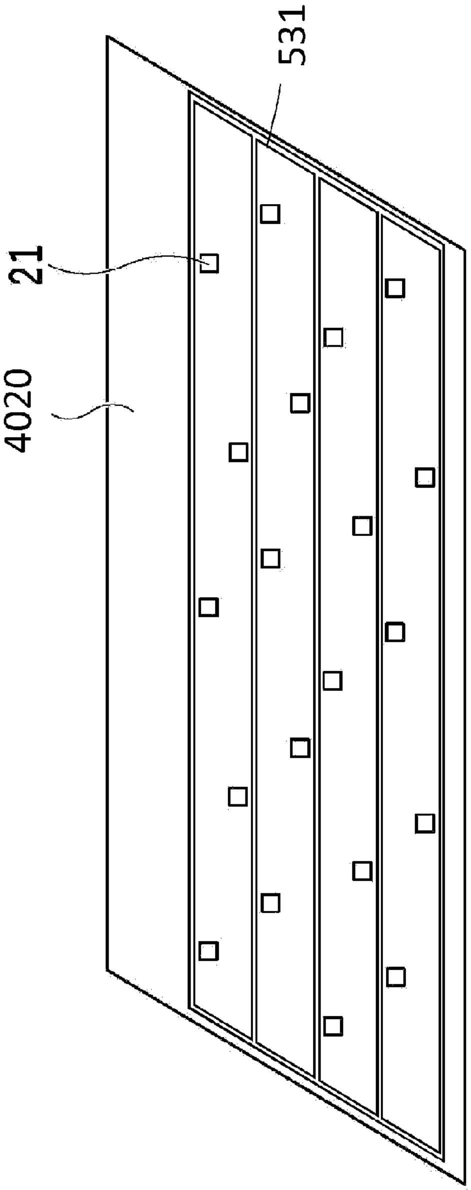

Now, the configuration of a liquid ejection head according to a fourth embodiment of the invention will be described. FIG. 14A is a plan view of the front surface of a recording element substrate 4010 provided with ejection outlets 13 according to the embodiment. FIG. 14B is a plan view of the back surface of the recording element substrate 4010. The recording element substrate 4010 according to the embodiment has the same configuration as the first embodiment except for the slits which will be described. In the following description, the elements with the same configurations as those of the first embodiment will be designated by the same reference characters, and a detailed description thereof will not be provided.

As shown in FIG. 14B, in a plan view of the recording element substrate 4010, a cover member 4020 has slit 531 as a cover member opening in a position corresponding to a region surrounding the liquid supply path 18 and the liquid recovery path 19 in the substrate 11.

In a plan view of the recording element substrate 4010, the direction in which the row of ejection outlets 13 extends is a reference direction. In this case, the liquid supply path 18 and the liquid recovery path 19 extend in the reference direction of the substrate 11. The slit 531 as a cover member opening includes a plurality of slits extending from one end to the other end in the reference direction and connected to one another by slits as openings extending in a direction orthogonal to the reference direction.

In this way, the cover member 4020 includes a plurality of partitioning members divided for each of the plurality of flow paths. The plurality of partitioning members are spaced apart from one another, and the gaps between the plurality of partitioning members serve as the slit 531 as a cover member opening through which the adhesive member 400 and the substrate 11 contact each other.

Since the slit 531 is provided to surround the liquid supply path 18 and the liquid recovery path 19, if interface delamination between the substrate 11 and the cover member 20 occurs at opposed ends of the row of ejection outlets 13, the possibility of communication between the flow paths and ink color mixing can be reduced.

Fifth Embodiment

Figure 15A:
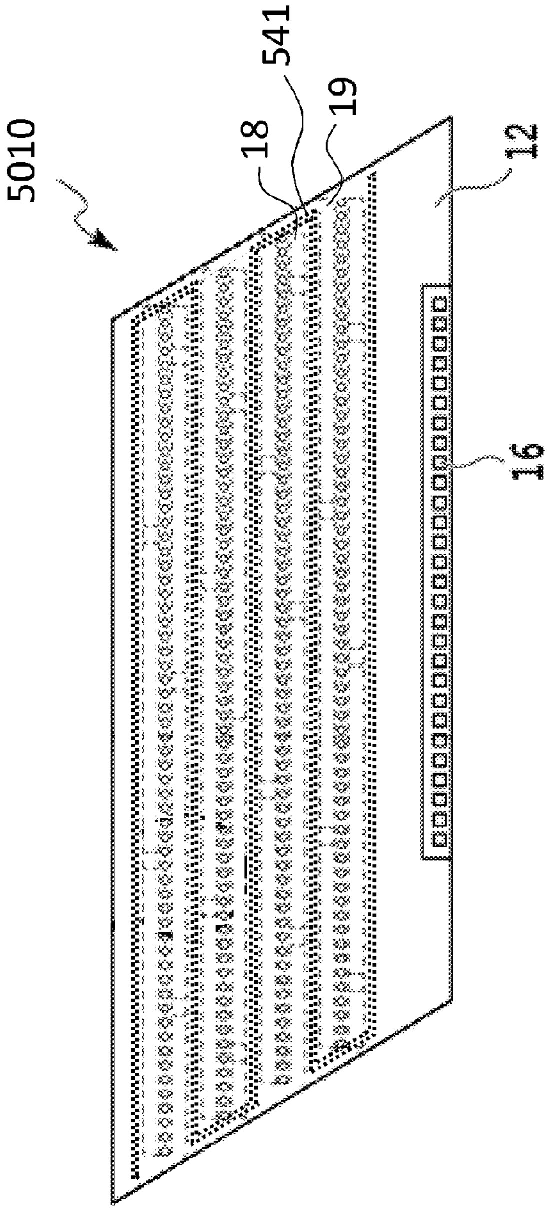
FIGS. 15A and 15B. are plan views of a recording element substrate according to a fifth embodiment of the invention.
Figure 15B:
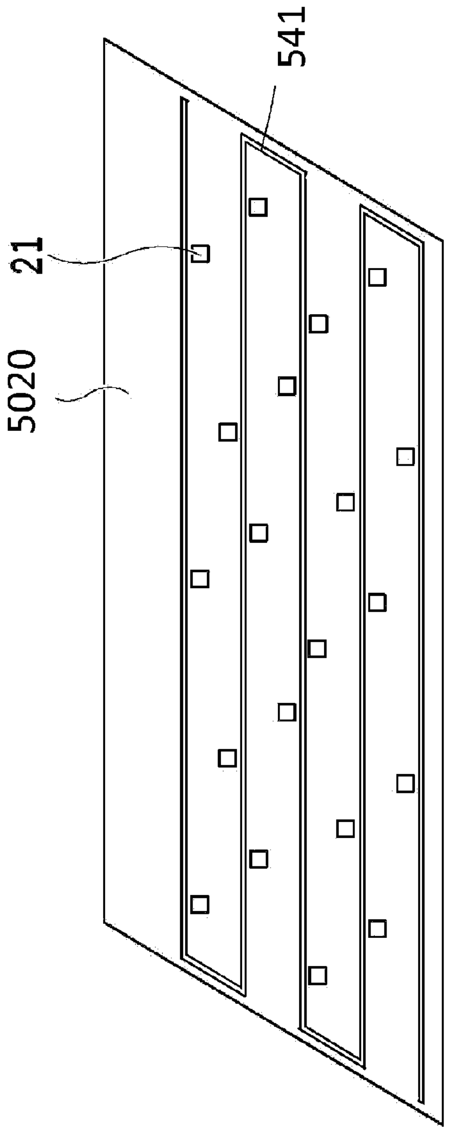

Now, the configuration of a liquid ejection head according to a fifth embodiment of the invention will be described. FIG. 15A is a plan view of the front surface of a recording element substrate 5010 provided with ejection outlets 13 according to the embodiment, and FIG. 15B is a plan view of the back surface of the recording element substrate 5010. The recording element substrate 5010 according to the embodiment has the same configuration as the first embodiment except for the slit which will be described. In the following description, the elements with the same configurations as those of the first embodiment will be designated by the same reference characters, and a detailed description thereof will not be provided.

As shown in FIG. 15B, in a plan view of the recording element substrate 5010, a cover member 5020 is provided with a slit 541 as a cover member opening in a so-called one stroke shape in a position corresponding to a region surrounding a part of the outer peripheries of the liquid supply path 18 and the liquid recovery path 19 in the substrate 11.

According to the embodiment, the slit 541 is provided to surround at least a part of the outer peripheries of the liquid supply path 18 and the liquid recovery path 19. In this way, if interface delamination between the substrate 11 and the cover member 5020 occurs at the ends of the row of ejection outlets 13, the possibility of communication between the flow paths and ink color mixing can be reduced.

Furthermore, in a plan view of the recording element substrate 5010, the direction in which the row of ejection outlets 13 extends is a reference direction. In this case, the liquid supply path 18 and the liquid recovery path 19 extend in the reference direction of the substrate 11. The slit 541 as a cover member opening includes a plurality of slits extending from one end to the other end in the reference direction and connected to one another by slits as an opening extending in a direction orthogonal to the reference direction.

Unlike the fourth embodiment, the slit 541 is formed in a single stroke shape, so that the slit 541 can be processed more easily than the slit 531 according to the fourth embodiment. According to the fourth embodiment, the part of the cover member 4020 inside the slit 531 and the part outside of slit 531 may be fragmented into individual pieces. However, with the slit 541 according to the embodiment, such fragmentation of the cover member 5020 can be suppressed and the possibility that the fragmented parts fall off due to interface delamination generated between the substrate 5010 and the cover member 5020 can also be reduced.

Sixth Embodiment

Figure 16A:
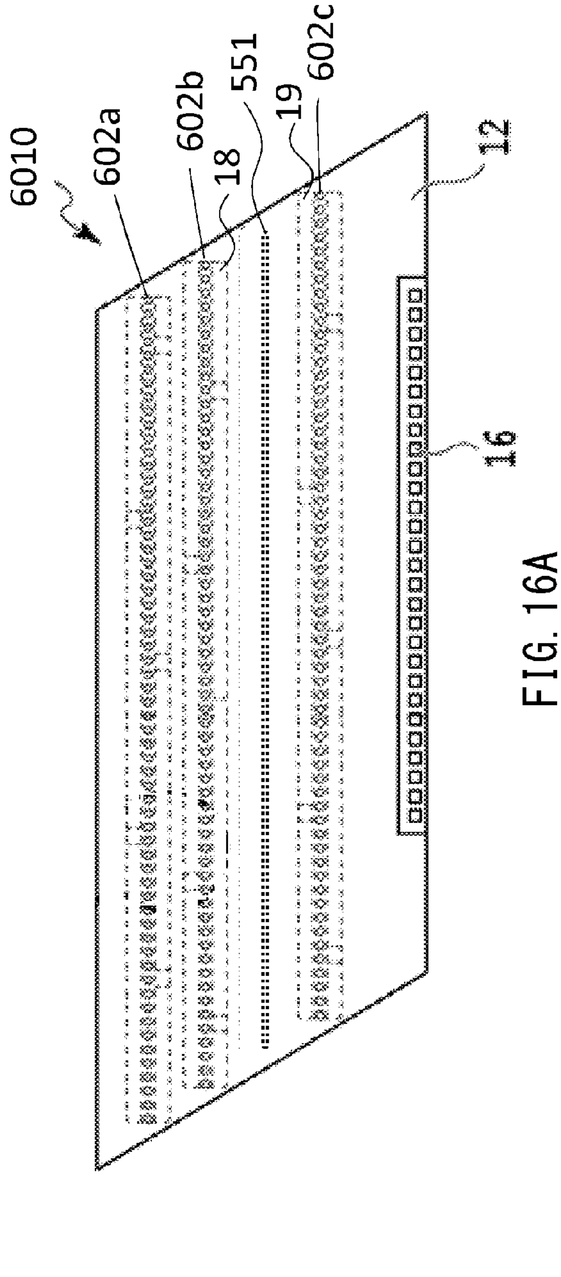
FIGS. 16A and 16B. are plan views of a recording element substrate according to a sixth embodiment of the invention.
Figure 16B:
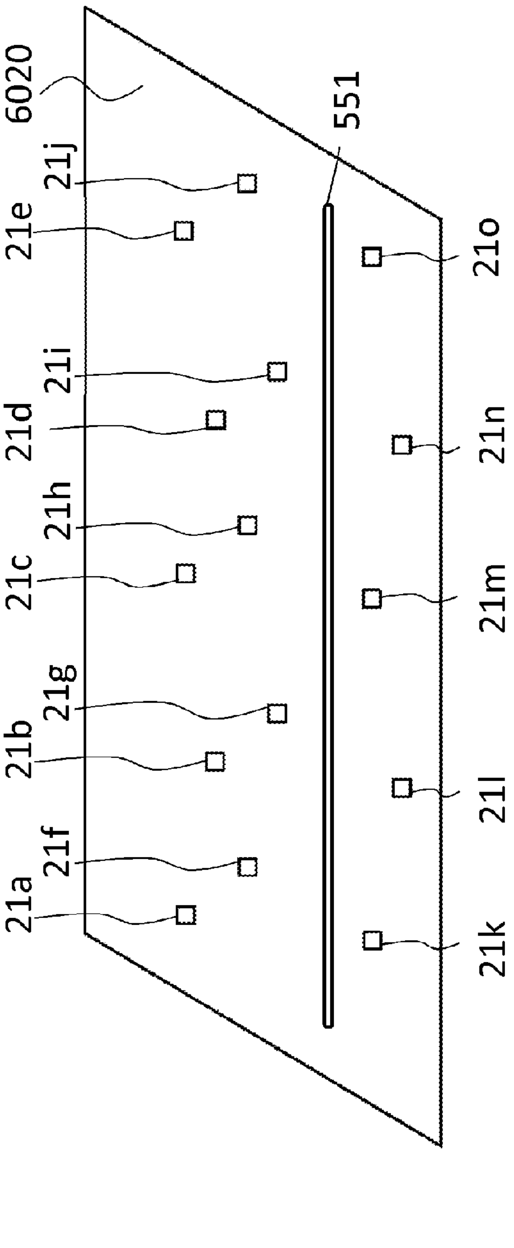

Now, the configuration of a liquid ejection head according to a sixth embodiment of the invention will be described. FIG. 16A is a plan view of the front surface of a recording element substrate 6010 provided with ejection outlets 13 according to the embodiment, and FIG. 16B is a plan view of the back surface of the recording element substrate 6010. In particular, the recording element substrate 6010 according to the embodiment has the same configuration as the first embodiment except for the slit which will be described. In the following description, the elements with the same configurations as those of the first embodiment will be designated by the same reference characters, and a detailed description thereof will not be provided.

As shown in FIG. 16A, three ejection outlet rows in total, i.e., two rows of ejection outlets 602*a* and 602*b* corresponding to black ink and one row of ejection outlets 602*c* corresponding to red ink are formed at the ejection outlet forming member 12 of the recording element substrate 6010.

According to the embodiment, the distance between the two rows of ejection outlets 602*b* and 602*c* is greater than the distance between the two ejection outlet rows 602*a* and 602*b*. The liquid supply path 18 and the liquid recovery path 19 extend in a direction parallel to the direction in which the ejection outlet rows formed at the substrate 11 of the recording element substrate 6010 extend. The liquid supply path 18 and the liquid recovery path 19 are in communication with an ejection outlet 601*x* (x is one of a, b, and c) through a supply opening 17*a* and a recovery opening 17*b*, respectively.

The cover member 6020 has communication holes 21*a* to 21*e* in communication with the liquid supply path 18 and the liquid recovery path 19 which are in communication with the ejection outlets 602*a*. Similarly, the cover member 6020 has communication holes 21*f* to 21*j* in communication with the liquid supply path 18 and the liquid recovery path 19 which are in communication with the ejection outlets 602*b*. Similarly, the cover member 6020 has communication holes 21*k* to 210 in communication with the liquid supply path 18 and the liquid recovery path 19 which are in communication with the ejection outlets 602*c*. Note that the communication holes 21*a* to 21*e* correspond to first communication holes, and the communication holes 21*f* to 21*j* correspond to second communication holes, and communication holes 21*k* to 210 correspond to third communication holes. The liquid supply path 18 and the liquid recovery path 19 in communication with the communication holes 21*a* to 21*e* correspond to a first flow path for a first liquid. The liquid supply path 18 and the liquid recovery path 19 in communication with the communication holes 21*f* to 21*j* correspond to a second flow path for a second liquid. The liquid supply path 18 and the liquid recovery path 19 in connection with the communication holes 21*k* to 210 correspond to a third flow path for third liquid.

As shown in FIG. 16B, according to the embodiment, the cover member 6020 has a slit 551 in a position corresponding to the region of the substrate 11 between the liquid supply path 18 and the liquid recovery path 19. In a plan view of the recording element substrate 6010, the cover member 6020 has the slit 551 in a position corresponding to the region of the substrate 11 between the two liquid supply paths, which are flow paths for ink in different colors formed. In other words, the cover member opening is provided between the second communication holes (21*f* to 21*j*) and the third communication holes (21*k* to 21*o*). In this way, the possibility of communication between the flow paths attributable to interface delamination between the substrate 11 and the cover member 6020 and ink color mixing can be reduced while reducing the man-hours required for processing the slit in the cover member. Since the slit 551 is provided between the rows of ejection outlets which eject ink in different colors, the slit 551 is provided in a larger area than between the rows of ejection outlets which eject ink in the same color. In this way, a longer distance can be secured between the slit 551 and the communication holes 21 of the cover member 6020, so that the slit can be processed more easily.

Seventh Embodiment

Figure 17A:
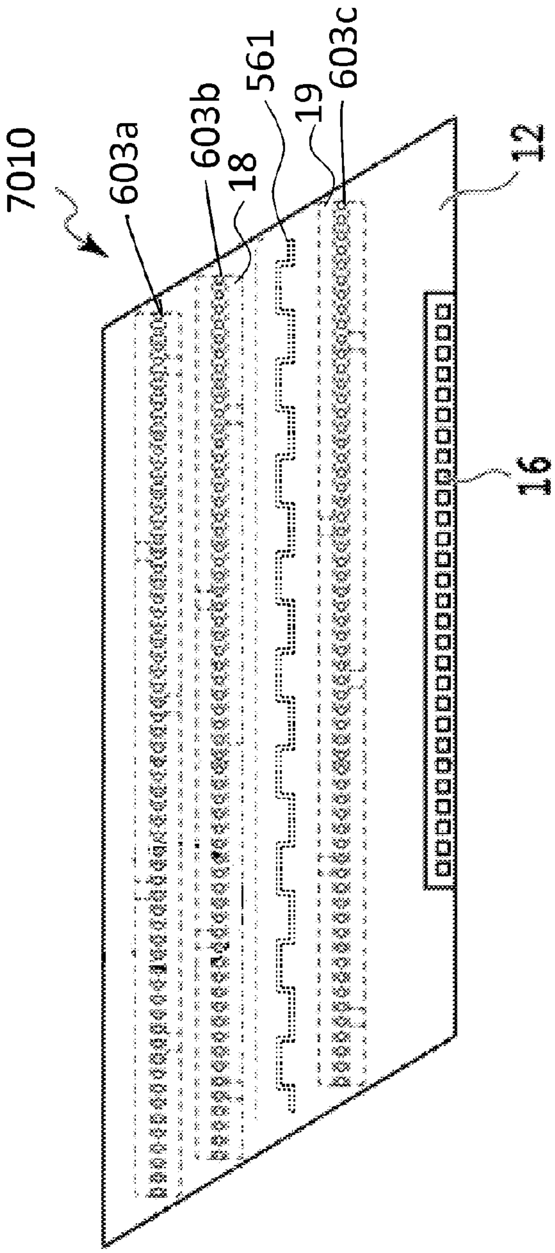
FIGS. 17A and 17B. are plan views of a recording element substrate according to a seventh embodiment of the invention.
Figure 17B:
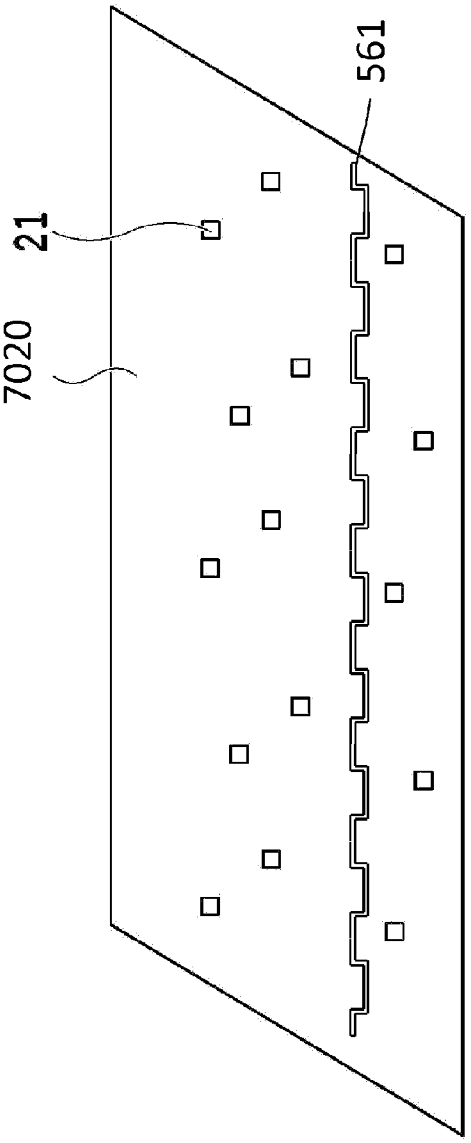

Now, the configuration of a liquid ejection head according to a seventh embodiment of the invention will be described. FIG. 17A is a plan view of the front surface of a recording element substrate 7010 provided with ejection outlets 13 according to the embodiment, and FIG. 17B is a plan view of the back surface of the recording element substrate 7010. The recording element substrate 7010 according to the embodiment has the same configuration as the first embodiment except for the slit which will be described. In the following description, the elements with the same configurations as those of the first embodiment will be designated by the same reference characters, and a detailed description thereof will not be provided.

As shown in FIG. 17B, in a plan view of the recording element substrate 7010, a cover member 7020 has a slit 561 as a cover member opening in the shape of so-called hairpin turns in a position corresponding to the region of the substrate 11 between the liquid supply path 18 and the liquid recovery path 19.

According to the embodiment, in a plan view of the recording element substrate 7010, the direction in which the rows of ejection outlets 13 extends is a reference direction. The liquid supply path 18 and the liquid recovery path 19 extend in the reference direction of the substrate 11. The slit 561 as the cover member opening is provided from one end to the other end in the reference direction to have a part extending in the reference direction and a part extending in a direction crossing the reference direction.

According to this embodiment, the cover member 7020 has the slit 561 in a position corresponding to a region between the two liquid supply paths 18 as flow paths for ink in different colors formed at the substrate 11 and the liquid recovery path 19. The slit 561 can have a larger opening area than the case in which the slit has a straight shape, and the slit has a bend. Therefore, in the slit 561, the contact area between the back surface of the substrate 11 and the adhesive member 400 can be greater the case in which the slit has a straight line shape, and stress applied on the interface between the back surface of the substrate 11 and the adhesive member 400 can be dispersed. In this way, the possibility of communication between the flow paths attributable to interface delamination between the substrate 11 and the cover member 7020 and ink color mixing can be reduced.

Eighth Embodiment

Figure 18A:
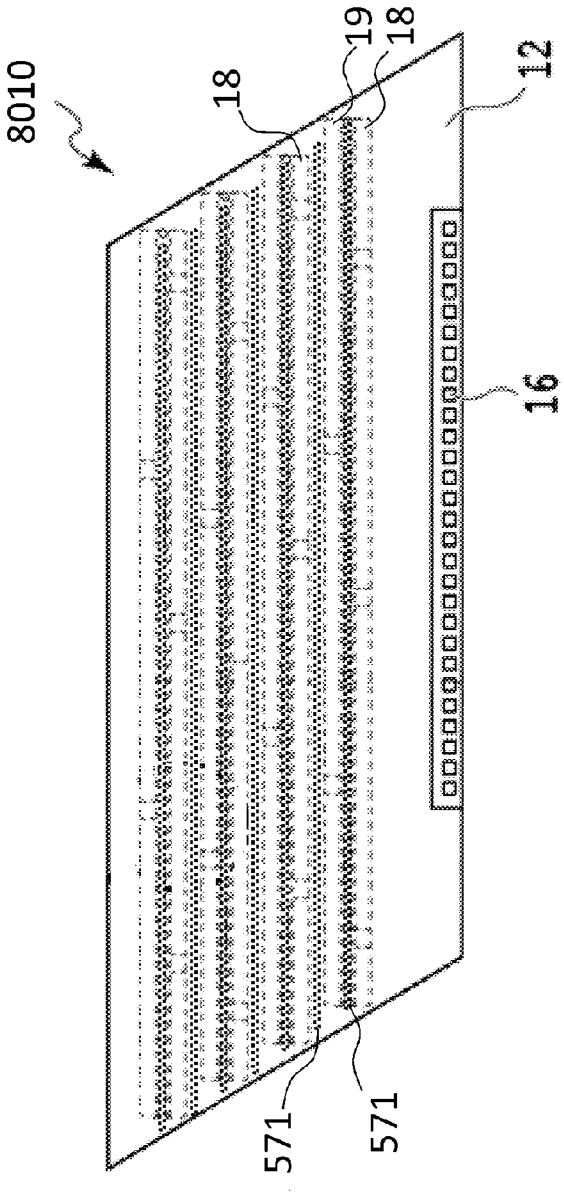
FIGS. 18A and 18B. are plan views of a recording element substrate according to an eighth embodiment of the invention.
Figure 18B:
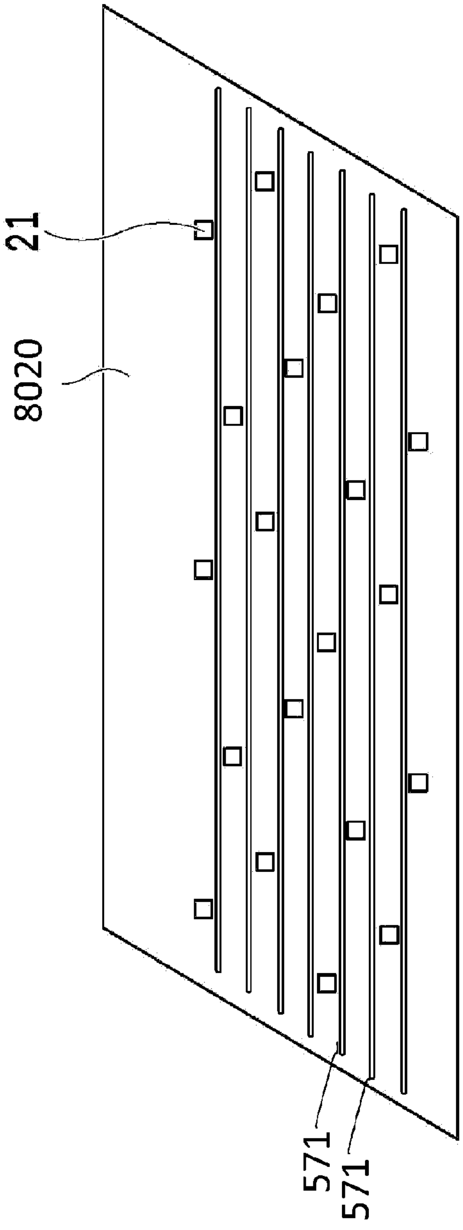

Now, the configuration of a liquid ejection head according to an eighth embodiment of the invention will be described. FIG. 18A is a plan view of the front surface of a recording element substrate 8010 provided with ejection outlets 13 according to the embodiment. FIG. 18B is a plan view of the back surface of the recording element substrate 8010. The recording element substrate 8010 according to the embodiment has the same configuration as the first embodiment except for the slits which will be described. In the following description, the elements with the same configurations as those of the first embodiment will be designated by the same reference characters, and a detailed description thereof will not be provided.

As shown in FIG. 18B, in a plan view of the recording element substrate 8010, a cover member 8020 has slits 571 each in a position corresponding to a region between the liquid supply path 18 and the liquid recovery path 19 in the substrate 11.

According to the embodiment, the slits 571 are formed in the cover member 8020 between the liquid supply paths and the liquid recovery paths in the substrate 11. In this way, more slits can be provided in the cover member than the above-described embodiments, so that the possibility of communication between the flow paths attributable to interface delamination between the substrate 11 and the cover member 8020 and ink color mixing can be reduced.

According to the present disclosure, the possibility of interface delamination between the substrate and the cover member can be reduced.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-102453, filed on Jun. 21, 2021, which is hereby incorporated by reference herein in its entirety.

What is claimed is:

1. A liquid ejection head comprising:

a recording element substrate having a substrate provided with a plurality of ejection ports provided on a first side of the substrate and a plurality of flow paths for liquid to be ejected on a recording material by a recording element and a cover member that is provided with a plurality of communication holes in communication with the plurality of flow paths and that is joined to a second side opposite to the first side of the substrate;

a liquid supply member supplying the liquid to the plurality of flow paths through the plurality of communication holes of the cover member and that is joined to the cover member on a side opposite to the substrate; and an adhesive member adhering the cover member and the liquid supply member, wherein at least a part of an abutment region of the cover member in abutment against the substrate and apart from a region provided with the plurality of communication holes has an opening for allowing the adhesive member and the substrate to contact each other.

2. The liquid ejection head according to claim 1, wherein the opening is formed in a position corresponding to a region of the substrate between a flow path for a first liquid and a flow path for a second liquid among the plurality of flow paths.

3. The liquid ejection head according to claim 2, wherein the first liquid and the second liquid have different colors from each other.

4. The liquid ejection head according to claim 1, wherein a first communication hole, a second communication hole, and a third communication hole among the communication holes are in communication with a first flow path for a first liquid, a second flow path for a second liquid, and a third flow path for a third liquid, respectively, in a plan view of the recording element substrate, a distance between the second communication hole and the third communication hole is greater than a distance between the first communication hole and the second communication hole, and the opening is formed between the second communication hole and the third communication hole.

5. The liquid ejection head according to claim 4, wherein the second liquid and the third liquid have different colors from each other.

6. The liquid ejection head according to claim 1, wherein the substrate has a substrate opening for the flow path at a surface of the substrate against which the cover member abuts, and in a plan view of the recording element substrate, the opening is formed in at least a part of a region surrounding the substrate opening in the abutment region.

7. The liquid ejection head according to claim 1, wherein in a plan view of the recording element substrate, the plurality of flow paths extend in a reference direction of the substrate, and the opening extends from one end to the other end in the reference direction, and with the opening being provided in plurality, the openings are connected to one another by an opening which extends in a direction orthogonal to the reference direction.

8. The liquid ejection head according to claim 1, wherein in a plan view of the recording element substrate, the plurality of flow paths extend in a reference direction of the substrate, and the opening extends from one end to the other end in the reference direction, and the opening is formed in a region a prescribed distance apart from the communication hole.

9. The liquid ejection head according to claim 1, wherein in a plan view of the recording element substrate, the plurality of flow paths extend in a reference direction of the substrate, and the opening is provided from one end to the other end in the reference direction, and the opening has a part which extends in the reference direction and a part which extends in a direction crossing the reference direction.

10. The liquid ejection head according to claim 1, wherein the flow path includes a flow path portion for supplying the liquid to the recording element and a flow path portion for recovering the liquid supplied to the recording element.

11. The liquid ejection head according to claim 1, wherein the recording element substrate is made of a silicon substrate.

12. The liquid ejection head according to claim 11, wherein the cover member is made of an epoxy resin material.

13. The liquid ejection head according to claim 12, wherein the adhesive member is made of an epoxy resin material containing a silane agent.

14. The liquid ejection head according to claim 1, wherein the cover member is a film type member.

15. A liquid ejection head comprising:

a recording element substrate having a substrate provided with a plurality of ejection ports provided on a first side of the substrate and a plurality of flow paths for liquid to be ejected on a recording material by a recording device, and a cover member that is provided with a plurality of communication holes in communication with the plurality of flow paths and that is joined to a second side opposite to the first side of the substrate;

a liquid supply member supplying the liquid to the plurality of flow paths through the plurality of communication holes of the cover member and that is joined to the cover member on a side opposite to the substrate; and an adhesive member adhering the cover member and the liquid supply member, wherein the cover member comprises a plurality of members divided respectively, for the plurality of flow paths, the plurality of members are provided a distance apart from one another, and a gap between the plurality of members serves as an opening through which the adhesive member and the substrate are in contact.

16. A liquid ejection device comprising:

a tank for storing liquid; and a liquid ejection head ejecting the liquid stored in the tank, the liquid ejection head including:

a recording element substrate having a substrate provided with a plurality of ejection ports provided on a first side of the substrate and a plurality of flow paths for liquid to be ejected on a recording material by a recording element and a cover member that is provided with a plurality of communication holes in communication with the plurality of flow paths and that is joined to a second side opposite to the first side of the substrate;

a liquid supply member supplying the liquid to the plurality of flow paths through the plurality of communication holes of the cover member and that is joined to the cover member on a side opposite to the substrate; and an adhesive member adhering the cover member and the liquid supply member, wherein at least a part of an abutment region of the cover member in abutment against the substrate and apart from a region provided with the plurality of communication holes has an opening for allowing the adhesive member and the substrate to contact each other.

* * * * *